United States Patent
Hattori et al.

(10) Patent No.: US 10,205,927 B2
(45) Date of Patent: Feb. 12, 2019

(54) ENCODING DEVICE AND ENCODING METHOD, AND DECODING DEVICE AND DECODING METHOD

(71) Applicant: Sony Corporation, Tokyo (JP)

(72) Inventors: Shinobu Hattori, Tokyo (JP); Hironari Sakurai, Tokyo (JP); Yoshitomo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/034,985

(22) Filed: Jul. 13, 2018

(65) Prior Publication Data

US 2018/0343437 A1 Nov. 29, 2018

Related U.S. Application Data

(63) Continuation of application No. 14/373,949, filed as application No. PCT/JP2013/051265 on Jan. 23, 2013, now Pat. No. 10,085,007.

(30) Foreign Application Priority Data

Jan. 31, 2012 (JP) ................................ 2012-019025

(51) Int. Cl.
*H04N 11/04* (2006.01)
*H04N 13/161* (2018.01)
(Continued)

(52) U.S. Cl.
CPC ......... *H04N 13/161* (2018.05); *H04N 13/178* (2018.05); *H04N 19/597* (2014.11)

(58) Field of Classification Search
None
See application file for complete search history.

(56) References Cited

U.S. PATENT DOCUMENTS 8,488,677 B2 * 7/2013 Jeon ..................... H04N 19/597
375/240.12
2007/0098083 A1 5/2007 Visharam et al.
(Continued)

FOREIGN PATENT DOCUMENTS

CN 101416149 A 4/2009
CN 101641954 A 2/2010
(Continued)

OTHER PUBLICATIONS

U.S. Appl. No. 14/373,949, filed Jul. 23, 2014, Hattori et al.
(Continued)

*Primary Examiner* — Dakshesh D Parikh
(74) *Attorney, Agent, or Firm* — Wolf, Greenfield & Sacks, P.C.

(57) ABSTRACT

The present technology relates to an encoding device and an encoding method, and a decoding device and a decoding method configured to reduce an encoding amount of the encoded stream when information regarding a depth image is included in the encoded stream.

A DPS encoding unit sets depth image information, which is information regarding a depth image, as a DPS different from a sequence parameter set and a picture parameter set. A slice encoding unit encodes the depth image to generate encoded data. Further, the slice encoding unit transmits an encoded stream including the DPS and the encoded data. The present technology can be applied to, for example, a multi-view image encoding device.

7 Claims, 26 Drawing Sheets

(51) Int. Cl.
*H04N 13/178* (2018.01)
*H04N 19/597* (2014.01)

(56) References Cited

U.S. PATENT DOCUMENTS

| | | |
|---|---|---|
| 2010/0098157 A1 | 4/2010 | Yang |
| 2010/0111183 A1* | 5/2010 | Jeon .................... H04N 19/597 375/240.16 |
| 2010/0266042 A1 | 10/2010 | Koo et al. |
| 2011/0063409 A1* | 3/2011 | Hannuksela ......... H04N 19/597 348/42 |
| 2011/0255796 A1 | 10/2011 | Nakamura et al. |

FOREIGN PATENT DOCUMENTS

| | | | |
|---|---|---|---|
| CN | 102265617 | A | 11/2011 |
| EP | 2387243 | A2 | 11/2011 |
| JP | 2008-518516 | A | 5/2008 |
| JP | 2009-531966 | A | 9/2009 |
| JP | 2010-157824 | A | 7/2010 |
| JP | 2010-522494 | A | 7/2010 |
| JP | 2010-525724 | A | 7/2010 |
| JP | 2011-244481 | A | 12/2011 |
| WO | WO 2013/031575 | A1 | 3/2013 |

OTHER PUBLICATIONS

International Search Report and Written Opinion dated Apr. 23, 2013 for PCT/JP2013/051265 and English translation thereof.
International Preliminary Report on Patentability dated Aug. 14, 2014 for PCT/JP2013/051265 and English translation thereof.
Extended European Search Report dated May 27, 2015 in connection with European Application No. 13743221.7.
Japanese Office Action dated Nov. 24, 2015 in connection with Japanese Application No. 2013-556335.
Chinese Office Action dated Jan. 9, 2017 in connection with Chinese Application No. 201380006563.5, and English translation thereof.
Chinese Office Action dated Apr. 27, 2017 in connection with Chinese Application No. 201510050838.6, and English translation thereof.
Chinese Office Action dated May 9, 2017 in connection with Chinese Application No. 201380006563.5, and English translation thereof.
[No Author Listed] Draft call for proposals on 3D video coding technology. Doc. N11679, International Organization for Standardization. Guangzhou, China, Oct. 2010: 18 pages.
[No Author Listed], WD on MVC extensions for inclusion of depth maps, International Organization for Standardization, ISO/IEC/JTC1/SC29/WG11/N12351, Dec. 2011, 14 pages.
Takahashi et al., Descriptions of 3D Video Coding Proposal (HEVC—Compatible Category) by Sony, MPEG2011/M22566, International Organization for Standardization, ISO/IEC JTC1/SC29/WG11, Geneva CH, Nov. 2011, 36 pages.

* cited by examiner

FIG. 5

| | | C | Descriptor |
|---|---|---|---|
| 1 | depth_parameter_set_rbsp() { | | |
| 2 |   depth_parameter_set_id | 11 | ue(v) |
| 3 |   pred_direction | 11 | ue(v) |
| 4 |   if(pred_direction == 0 \|\| pred_direction == 1) { | | |
| 5 |     ref_dps_id0 | 11 | ue(v) |
| 6 |     predWeight0 = 64 | | |
| 7 |   } | | |
| 8 |   if(pred_direction == 0) { | | |
| 9 |     ref_dps_id1 | 11 | ue(v) |
| 10 |     pred_weight0 | 11 | u(6) |
| 11 |     predWeight0 = pred_weight0 | | |
| 12 |   } | | |
| 13 |   num_views_minus1 | 11 | ue(v) |
| 14 |   depth_ranges(pred_direction, depth_parameter_set_id) | | |
| 15 |   vsp_param_flag | 11 | u(1) |
| 16 |   if(vsp_param_flag) | | |
| 17 |     vsp_param(pred_direction, depth_parameter_set_id) | | |
| 18 |   depth_param_additional_extension_flag | 11 | u(1) |
| 19 |   if(depth_param_additional_extension_flag == 1) | | |
| 20 |     while(more_rbsp_data()) | | |
| 21 |       depth_param_additional_extension_data_flag | 11 | u(1) |
| 22 |   rbsp_trailing_bits() | | |
| 23 | } | | |

FIG. 6

| | C | Descriptor |
|---|---|---|
| 1 slice_header ( ) { | | |
| 2 ... | | |
| 3 if(nal_unit_type == 21) { | | |
| 4 if(slice_type == P) | | |
| 5 depth_weighted_pred_flag | | |
| 6 if(slice_type == B) | | |
| 7 depth_weighted_bipred_flag | | |
| 8 if((depth_weighted_pred_flag == 1 && slice_type == P) \|\| | | |
| 9 (depth_weighted_bipred_flag == 1 && slice_type == B)) | | |
| 10 depth_parameter_set_id | | |
| 11 } | | |
| 12 } | | |

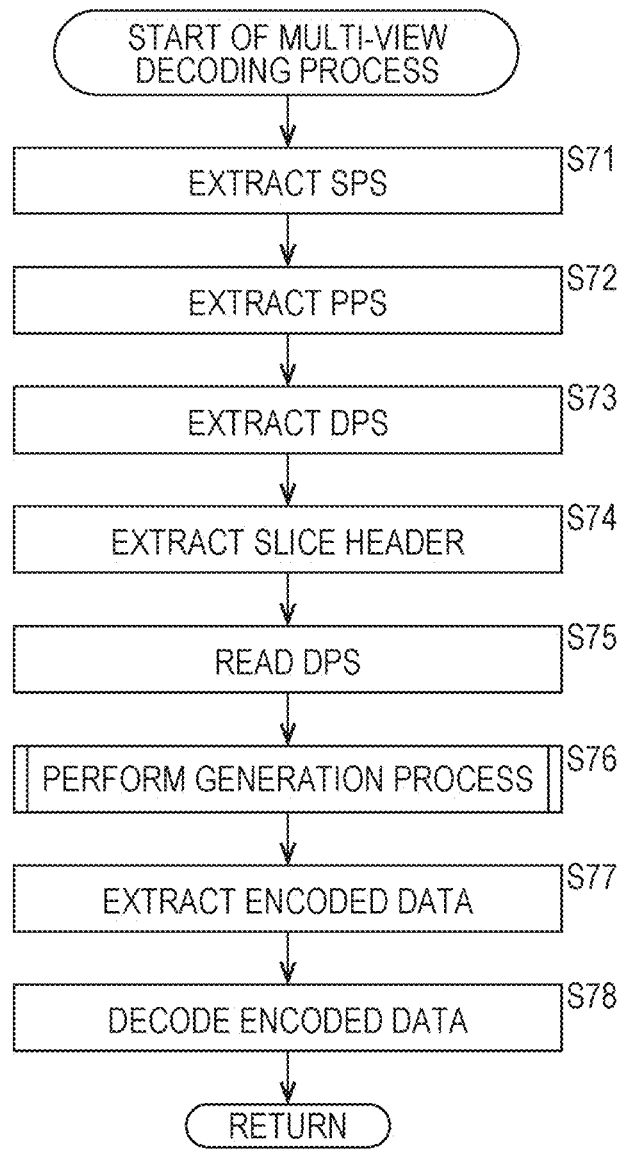

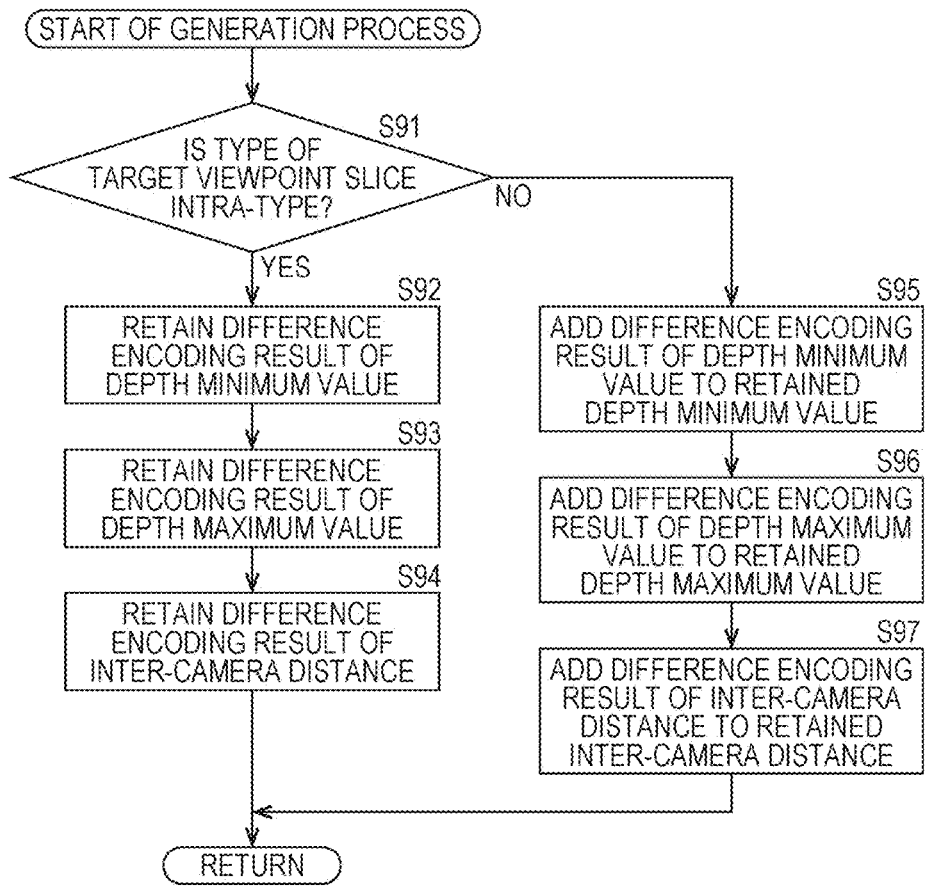

FIG. 16

| | | C | Descriptor |
|---|---|---|---|
| 1 | seq_parameter_set_3dvc_extension( ) { | | |
| 2 |   depth_range_present_flag | 0 | u(1) |
| 3 |   if(depth_range_present_flag) | | |
| 4 |     depth_parameter_set_id | 0 | ue(v) |
| 5 |     depth_weighted_pred_flag | | |
| 6 |     depth_weighted_bipred_flag | | |
| 7 | } | | |

FIG. 17

| nal_unit_type | Content of NAL unit and RBSP syntax structure | C | Annex A NAL unit type class | Annex G and Annex I NAL unit type class |
|---|---|---|---|---|
| 0 | Unspecified | | non-VCL | non-VCL |
| ... | ... | | | |
| 16 | Depth parameter set | 11 | non-VCL | non-VCL |
| 17..18 | Reserved | | non-VCL | non-VCL |
| 21 | Coded slice extension for depth view components /*specified in Annex I */ slice_layer_3dvc_extension_rbsp() /* specified in Annex I */ | 2, 3, 4 | Non-VCL | VCL |

FIG. 18

| | | C | Descriptor |
|---|---|---|---|
| 1 | slice_layer_3dvc_extension_rbsp( ) { | | |
| 2 | slice_header_3dvc_extension( ) /* specified in Annex I */ | 2 | |
| 3 | slice_data( ) | | |
| 4 | rbsp_slice_trailing_bits( ) | 2 | |
| 5 | } | | |

FIG. 19

| | C | Descriptor |
|---|---|---|
| 1 slice_header_3dvc_extension( ) { | | |
| 2   slice_header( ) | | |
| 3   if(depth_weighted_pred_flag == 1 || depth_weighted_bipred_flag == 1) | | |
| 4     depth_parameter_set_id | 2 | ue(v) |
| 5 } | | |

FIG. 20

| | | C | Descriptor |
|---|---|---|---|
| 1 | slice_header_3dvc_extension( ) { | | |
| 2 | slice_header() | | |
| 3 | if(slice_type == P) { | | |
| 4 | depth_weighted_pred_flag | 2 | u(1) |
| 5 | } else if(slice_type == B) { | | |
| 6 | depth_weighted_bipred_flag | 2 | u(1) |
| 7 | } | | |
| 8 | if(depth_weighted_pred_flag == 1 \|\| depth_weighted_bipred_flag == 1) | | |
| 9 | depth_parameter_set_id | 2 | ue(v) |
| 10 | } | | |
| 11 | } | | |

FIG. 21

| | | C | Descriptor |
|---|---|---|---|
| 1 | nal_unit(NumBytesInNALunit) { | | |
| 2 | forbidden_zero_bit | All | f(1) |
| 3 | nal_ref_idc | All | u(2) |
| 4 | nal_unit_type | All | u(5) |
| 5 | NumBytesInRBSP = 0 | | |
| 6 | nalUnitHeaderBytes = 1 | | |
| 7 | if(nal_unit_type == 14 \|\| nal_unit_type == 20) { | | |
| 8 | svc_extension_flag | All | u(1) |
| 9 | if(svc_extension_flag) | | |
| 10 | nal_unit_header_svc_extension( ) /* specified in Annex G */ | All | |
| 11 | else | | |
| 12 | nal_unit_header_mvc_extension( ) /* specified in Annex H */ | All | |
| 13 | nalUnitHeaderBytes += 3 | | |
| 14 | } | | |
| 15 | if(nal_unit_type == 21) { | | |
| 16 | 3dvc_extension_flag | All | |
| 17 | nal_unit_header_mvc_extension( ) /* specified in Annex H */ | All | |
| 18 | } | | |
| 19 | for(i=nalUnitHeaderBytes;i<NumBytesInNALunit;i++) { | | |
| 20 | if((i+2<NumBytesInNALunit && next_bits(24) == 0x000003) { | | |
| 21 | rbsp_byte[NumBytesInRBSP++] | All | b(8) |
| 22 | rbsp_byte[NumBytesInRBSP++] | All | b(8) |
| 23 | i += 2 | | |
| 24 | emulation_prevention_three_byte /* equal to 0x03 */ | All | f(8) |
| 25 | }else | | |
| 26 | rbsp_byte[NumBytesInRBSP++] | All | b(8) |
| 27 | } | | |
| 28 | } | | |

FIG. 22

| | C | Descriptor |
|---|---|---|
| 1 slice_layer_extension_rbsp( ) { | | |
| 2   if(svc_extension_flag) { | | |
| 3     slice_header_in_scalable_extension( ) /* specified in Annex G */ | 2 | |
| 4     if(!slice_skip_flag) | | |
| 5       slice_data_in_scalable_extension( ) /* specified in Annex G */ | 2\|3\|4 | |
| 6   }else if(3dvc_extension_flag) { | | |
| 7     slice_header_3dvc_extension( ) /* specified in Annex I */ | 2 | |
| 8     slice_data( ) | 2\|3\|4 | |
| 9   }else{ | | |
| 10    slice_header( ) | 2 | |
| 11    slice_data( ) | 2\|3\|4 | |
| 12  } | | |
| 13  rbsp_slice_trailing_bits( ) | 2 | |
| 14 } | | |

FIG. 23

| SPS #0 | PPS #0 | DEPTH MINIMUM VALUE = 10<br>DEPTH MAXIMUM VALUE = 50<br>INTER-CAMERA DISTANCE = 100 | Intra Slice | DPS | DIFFERENCE OF DEPTH<br>MINIMUM VALUE = -1<br>DIFFERENCE OF DEPTH<br>MAXIMUM VALUE = -2<br>DIFFERENCE OF INTER-<br>CAMERA DISTANCE = +5 | Inter Slice | DPS | DEPTH MINIMUM VALUE = 9<br>DEPTH MAXIMUM VALUE = 48<br>INTER-CAMERA DISTANCE = 105 | DIFFERENCE OF DEPTH<br>MINIMUM VALUE = -2<br>DIFFERENCE OF DEPTH<br>MAXIMUM VALUE = -1<br>DIFFERENCE OF INTER-<br>CAMERA DISTANCE = +5 | Inter Slice | DPS | DEPTH MINIMUM VALUE = 7<br>DEPTH MAXIMUM VALUE = 47<br>INTER-CAMERA DISTANCE = 110 |
|---|---|---|---|---|---|---|---|---|---|---|---|---|
| | PPS #1 | DPS | DEPTH MINIMUM VALUE = 7<br>DEPTH MAXIMUM VALUE = 47<br>INTER-CAMERA DISTANCE = 110 | DIFFERENCE OF DEPTH<br>MINIMUM VALUE = -2<br>DIFFERENCE OF DEPTH<br>MAXIMUM VALUE = -1<br>DIFFERENCE OF INTER-<br>CAMERA DISTANCE = +5 | Inter Slice | DPS | DEPTH MINIMUM VALUE = 7<br>DEPTH MAXIMUM VALUE = 47<br>INTER-CAMERA DISTANCE = 110 | DIFFERENCE OF DEPTH<br>MINIMUM VALUE = -2<br>DIFFERENCE OF DEPTH<br>MAXIMUM VALUE = -1<br>DIFFERENCE OF INTER-<br>CAMERA DISTANCE = +5 | Inter Slice | DPS | DEPTH MINIMUM VALUE = 7<br>DEPTH MAXIMUM VALUE = 47<br>INTER-CAMERA DISTANCE = 110 | |

ENCODING DEVICE AND ENCODING METHOD, AND DECODING DEVICE AND DECODING METHOD

The present application is a Continuation of U.S. application Ser. No. 14/373,949, filed Jul. 23, 2014, entitled "ENCODING DEVICE AND ENCODING METHOD, AND DECODING DEVICE AND ENCODING METHOD FOR IMAGES, THE METHOD REDUCING AN ENCODING AMOUNT", which is a national stage filing under 35 U.S.C. 371 of International Patent Application Serial No. PCT/JP2013/051265, filed Jan. 23, 2013. Foreign priority benefits are claimed under 35 U.S.C. § 119(a)-(d) or 35 U.S.C. § 365(b) of Japanese application number 2012-019025, filed Jan. 31, 2012. The entire contents of these applications are incorporated herein by reference in their entirety.

TECHNICAL FIELD

The present technology relates to an encoding device and an encoding method, and a decoding device and a decoding method, and particularly, to an encoding device and an encoding method, and a decoding device and a decoding method configured to reduce an encoding amount of the encoded stream when information regarding a depth image is included in the encoded stream.

BACKGROUND ART

In recent years, 3D images have attracted attention. As schemes of viewing the 3D images, schemes (hereinafter referred to as glasses type schemes) of putting on glasses that open a left-eye shutter at the time of display of one image between 2-viewpoint images and open a right-eye shutter at the time of display of the other image and viewing the alternately displayed 2-viewpoint images are general.

However, in such glasses type schemes, viewers are required to purchase glasses separately from 3D image display devices, thereby reducing viewer's purchase willingness to purchase. Since the viewers are required to put on glasses at the time of viewing, the viewer may feel troublesome. Accordingly, demands for of viewing schemes (hereinafter referred to as non-glasses type schemes) of viewing 3D images without putting on glasses have increased.

In such non-glasses type schemes, viewpoint images of 3 or more viewpoints are displayed so that viewable angles are different for each viewpoint, and thus viewers can view 3D images without putting on glasses when merely viewing any 2-viewpoint images with the left and right eyes, respectively.

As methods of displaying 3D images in the non-glasses type schemes, methods of acquiring a predetermined viewpoint color image and a depth image, generating a multi-view color image including a viewpoint other than the predetermined viewpoint based on the color image and the depth image, and displaying the multi-view color image have been devised. Here, the multi-view refers to 3 or more viewpoints.

As methods of encoding a multi-view color image and a depth image, methods of encoding the color image and the depth image separately have been suggested (for example, see Patent Literature 1).

CITATION LIST

Non Patent Literature

NPL 1: "Draft Call for Proposals on 3D Video Coding Technology", INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, MPEG2010/N11679 Guangzhou, China, October 2010

SUMMARY OF INVENTION

Technical Problem

However, when information regarding a depth image is included in an encoded stream, a reduction in an encoding amount of the encoded stream has not been considered.

The present technology is finalized in view of such circumstances and is a technology for reducing an encoding amount of the encoded stream when information regarding a depth image is included in the encoded stream.

Solution to Problem

According to a first aspect of the present technology, there is provided an encoding device including: a setting unit that sets depth image information which is information regarding a depth image as a parameter set different from a sequence parameter set and a picture parameter set; an encoding unit that encodes the depth image to generate encoded data; and a transmission unit that transmits an encoded stream including the parameter set which is set by the setting unit and the encoded data generated by the encoding unit.

An encoding method according to the first aspect of the present technology corresponds to the encoding device according to the first aspect of the present technology.

According to the first aspect of the present technology, depth image information which is information regarding a depth image is set as a parameter set different from a sequence parameter set and a picture parameter set; the depth image is encoded to generate encoded data; and an encoded stream including the parameter set and the encoded data is transmitted.

According to a second aspect of the present technology, there is provided a decoding device including: an acquisition unit that acquires a parameter set and encoded data from an encoded stream including the parameter set in which depth image information, which is information regarding a depth image, is set and which is different from a sequence parameter set and a picture parameter set and the encoded data of the depth image; a parsing processing unit that parses the depth image information from the parameter set acquired by the acquisition unit; and a decoding unit that decodes the encoded data acquired by the acquisition unit.

A decoding method according to the second aspect of the present technology corresponds to the decoding device according to the second aspect of the present technology.

According to the second aspect of the present technology, a parameter set and encoded data are acquired from an encoded stream including the parameter set in which depth image information, which is information regarding a depth image, is set and which is different from a sequence parameter set and a picture parameter set and the encoded data of the depth image; the depth image information is parsed from the parameter set; and the encoded data is decoded.

The encoding device according to the first aspect and the decoding device according to the second aspect can be realized by allowing a computer to execute a program.

To realize the encoding device according to the first aspect and the decoding device according to the second aspect, the program allowed to be executed by the computer can be transmitted via a transmission medium or can be recorded on a recording medium to be provided.

Advantageous Effects of Invention

According to the first aspect of the present technology, it is possible to reduce an encoding amount of the encoded stream when information regarding the depth image is included in the encoded stream.

According to the second aspect of the present technology, it is possible to decode the encoded stream for which the encoding amount of the encoded stream is reduced when the information regarding the depth image is included in the encoded stream.

BRIEF DESCRIPTION OF DRAWINGS

FIG. 5 is a diagram illustrating an example of the syntax of a DPS.

FIG. 6 is a diagram illustrating an example of the syntax of a slice header.

FIG. 13 is a flowchart illustrating details of a multi-view decoding process in FIG. 12.

FIG. 14 is a flowchart illustrating details of a generation process in FIG. 13.

FIG. 15 is a diagram illustrating an example of the syntax of an extended SPS.

FIG. 16 is a diagram illustrating another example of the syntax of the extended SPS.

FIG. 17 is a diagram illustrating definition of an extended slice_layer.

FIG. 18 is a diagram illustrating an example of the syntax of the extended slice_layer.

FIG. 19 is a diagram illustrating an example of the syntax of an extended slice header.

FIG. 20 is a diagram illustrating another example of the syntax of an extended slice header.

FIG. 21 is a diagram illustrating an example of the syntax of an NAL unit.

FIG. 22 is a diagram illustrating an example of the syntax of a slice_layer.

FIG. 23 is a diagram illustrating another example of the structure of the encoded stream.

DESCRIPTION OF EMBODIMENTS

<Description of Depth Image (Disparity-Relevant Image) in the Present Specification>

Figure 1:
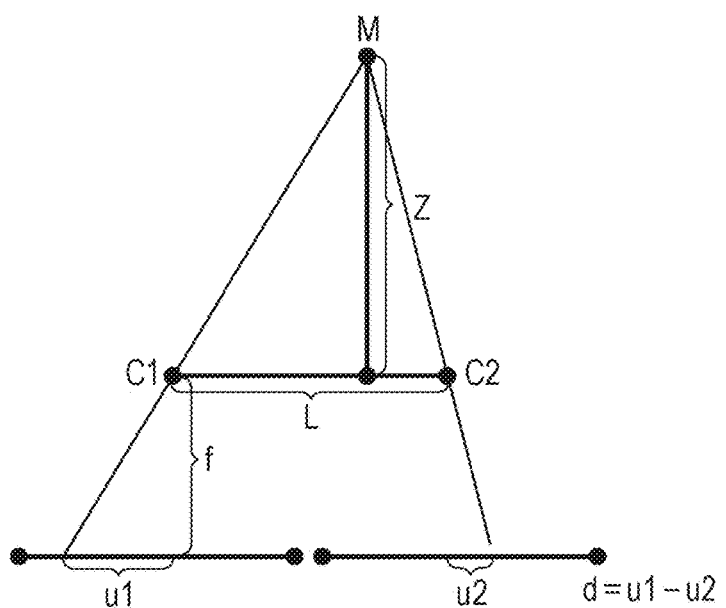
FIG. 1 is a diagram illustrating disparity and depth.

FIG. 1 is a diagram illustrating disparity and depth.

As illustrated in FIG. 1, when a color image of a subject M is photographed by a camera c1 disposed at a position C1 and a camera c2 disposed at a position C2, a depth Z of the subject M, which is a distance away from the camera c1 (camera c2) and the subject in a depth direction, is defined by Equation (a) below.

[Math. 1]

$$Z = (L/d) \times f \quad (a)$$

L is a distance (hereinafter referred to as an inter-camera distance) between the positions C1 and C2 in the horizontal direction. Also, d is a value obtained by subtracting a distance u2 of the position of the subject M on a color image photographed by the camera c2 in the horizontal direction from the center of the color image from a distance u1 of the position of the subject M on a color image photographed by the camera c1 in the horizontal direction from the center of the color image, that is, disparity. Further, f is a focal distance of the camera c1, and the focal distance of the camera c1 is assumed to be the same as the focal distance of the camera c2 in Equation (a).

As expressed in Equation (a), the disparity d and the depth Z can be converted uniquely. Accordingly, in the present specification, an image indicating the disparity d between the 2-viewpoint color images photographed by the cameras c1 and c2 and an image indicating the depth Z are generally referred to as a depth image.

The depth image may be an image indicating the disparity d or the depth Z, and not the disparity d or the depth Z itself but a value obtained by normalizing the disparity d, a value obtained by normalizing a reciprocal 1/Z of the depth Z, or the like can be used as a pixel value of the depth image.

A value I obtained by normalizing the disparity d by 8 bits (0 to 255) can be obtained by Equation (b) below. The number of bits for the normalization of the disparity d is not limited to 8 bits, but other numbers of bits such as 10 bits or 12 bits can be used.

[Math. 2]

$$I = \frac{255 \times (d - D_{min})}{D_{max} - D_{min}} \quad (b)$$

In Equation (b), $D_{max}$ is the maximum value of the disparity d and $D_{min}$ is the minimum value of the disparity d. The maximum value $D_{max}$ and the minimum value $D_{min}$ may be set in a unit of one screen or may be set in units of a plurality of screens.

A value y obtained by normalizing the reciprocal 1/Z of the depth Z by 8 bits (0 to 255) can be obtained by Equation (c) below. The number of bits for the normalization of the reciprocal 1/Z of the depth Z is not limited to 8 bits, but other numbers of bits such as 10 bits or 12 bits can be used.

[Math. 3]

$$y = 255 \times \frac{\frac{1}{Z} - \frac{1}{Z_{far}}}{\frac{1}{Z_{near}} - \frac{1}{Z_{far}}} \quad (c)$$

In Equation (c), $Z_{far}$ is the maximum value of the depth Z and $Z_{near}$ is the minimum value of the depth Z. The maximum value $Z_{far}$ and the minimum value $Z_{near}$ may be set in a unit of one screen or may be set in units of a plurality of screens.

Thus, in the present specification, in consideration of the fact that the disparity d and the depth Z can be uniquely converted, an image for which the value I obtained by normalizing the disparity d is set as a pixel value and an image for which the value y obtained by normalizing the reciprocal 1/Z of the depth Z is set as a pixel value are generally referred to as a depth image. Here, a color format of the depth image is assumed to be YUV420 or YUV400, but other color formats can be used.

When focus is on information regarding the value I or the value Y itself rather than on the pixel value of the depth image, the value I or the value y is set as depth information (disparity-relevant value). Further, a result obtained by mapping the value I and the value y is referred to as a depth map.

<Embodiment>
<Example of Configuration of Encoding Device of Embodiment>

Figure 2:
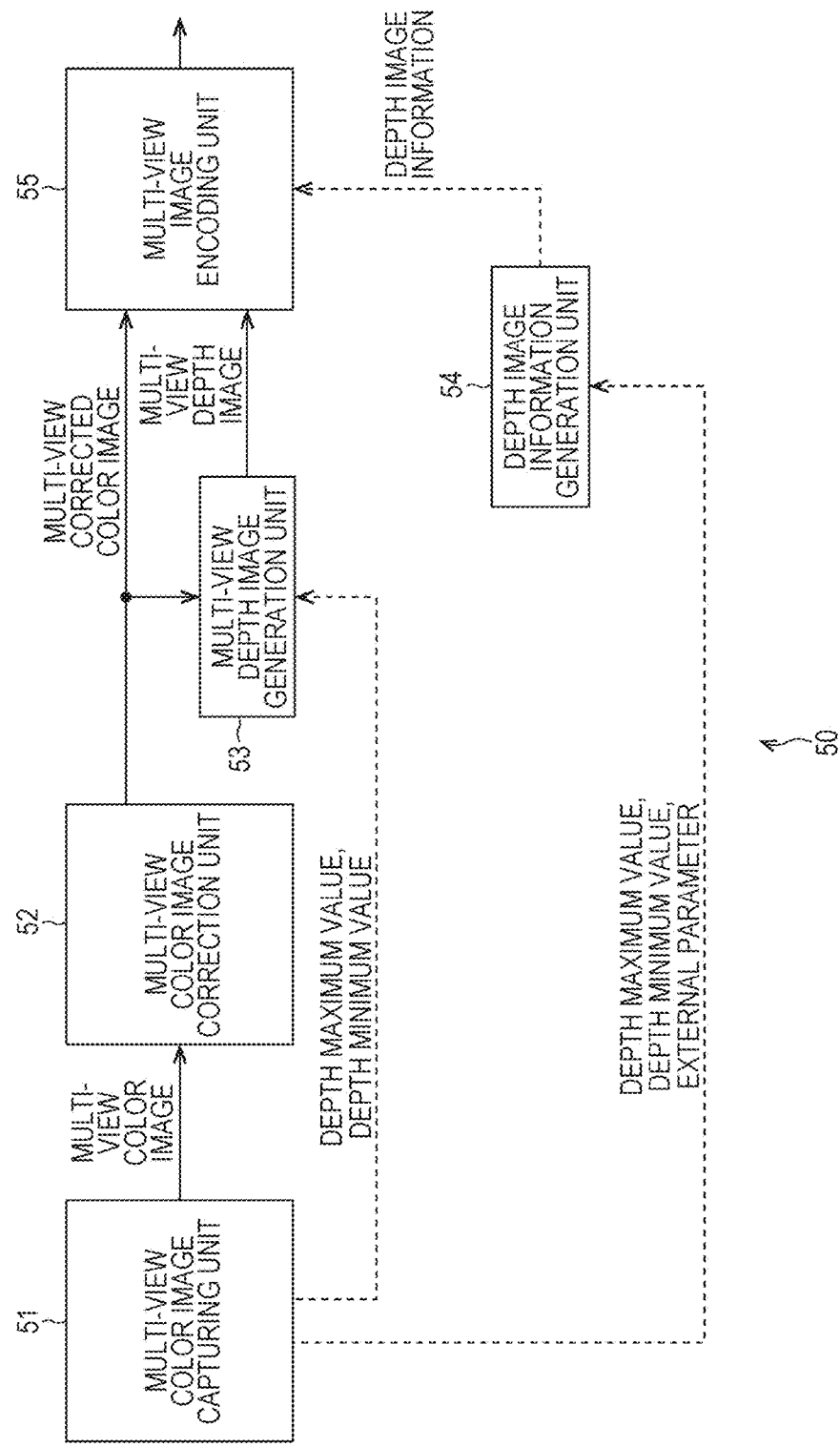
FIG. 2 is a block diagram illustrating an example of the configuration of an encoding device of an embodiment to which the present technology is applied.

FIG. 2 is a block diagram illustrating an example of the configuration of an encoding device of an embodiment to which the present technology is applied.

An encoding device 50 in FIG. 2 is configured to include a multi-view color image capturing unit 51, a multi-view color image correction unit 52, a multi-view depth image generation unit 53, a depth image information generation unit 54, and a multi-view image encoding unit 55. The encoding device 50 transmits depth image information (encoding parameter) which is information regarding a depth image.

Specifically, the multi-view color image capturing unit 51 of the encoding device 50 captures a color image with multi-views and supplies the color image as a multi-view color image to the multi-view color image correction unit 52. The multi-view color image capturing unit 51 generates an extrinsic parameter, a depth maximum value (disparity-relevant maximum value), and a depth minimum value (disparity-relevant minimum value) (details of which will be described below) of each viewpoint. The multi-view color image capturing unit 51 supplies the extrinsic parameter, the depth maximum value, and the depth minimum value to the depth image information generation unit 54 and supplies the depth maximum value and the depth minimum value to the multi-view depth image generation unit 53.

The extrinsic parameter is a parameter that defines the position of the multi-view color image capturing unit 11 in the horizontal direction. The depth maximum value is the maximum value $Z_{far}$ of the depth Z when the depth image generated by the multi-view depth image generation unit 53 is an image indicating the depth Z, and is the maximum value $D_{max}$ of the disparity d when the depth image is an image indicating the disparity d. The depth minimum value is the minimum value $Z_{near}$ of the depth Z when the depth image generated by the multi-view depth image generation unit 53 is an image indicating the depth Z, and is the minimum value $D_{min}$ of the disparity d when the depth image is an image indicating the disparity d.

The multi-view color image correction unit 52 performs color correction, luminance correction, distortion correction, and the like on the multi-view color image supplied from the multi-view color image capturing unit 51. Thus, a focal distance of the multi-view color image capturing unit 51 in the horizontal direction (X direction) in the multi-view color image after the correction is common to all of the viewpoints. The multi-view color image correction unit 52 supplies the multi-view color image after the correction as a multi-view corrected color image to the multi-view depth image generation unit 53 and the multi-view image encoding unit 55.

The multi-view depth image generation unit 53 generates a depth image of multi-views from the multi-view corrected color image supplied from the multi-view color image correction unit 52 based on the depth maximum value and the depth minimum value supplied from the multi-view color image capturing unit 51. Specifically, the multi-view depth image generation unit 53 obtains the disparity-relevant value of each pixel from the multi-view corrected color image for each viewpoint of the multi-views and normalizes the disparity-relevant value based on the depth maximum value and the depth minimum value. Then, the multi-view depth image generation unit 53 generates a depth image for which the disparity-relevant value of each pixel normalized for each viewpoint of the multi-views is set as the pixel value of each pixel of the depth image.

The multi-view depth image generation unit 53 supplies the generated depth image of the multi-views as a multi-view depth image to the multi-view image encoding unit 55.

The depth image information generation unit 54 generates depth image information of each viewpoint. Specifically, the depth image information generation unit 54 obtains an inter-camera distance of each viewpoint based on the extrinsic parameter of each viewpoint supplied from the multi-view color image capturing unit 51. The inter-camera distance is a distance between the position of the multi-view color image capturing unit 51 in the horizontal direction at the time of the capturing of a color image of each viewpoint corresponding to the multi-view depth image and the position of the multi-view color image capturing unit 51 in the horizontal direction at the time of the capturing of a color image having disparity corresponding to the color image and the depth image.

The depth image information generation unit 54 sets, as depth image information of each viewpoint, the depth maximum value and the depth minimum value of each viewpoint from the multi-view color image capturing unit 51 and the inter-camera distance of each viewpoint. The depth image information generation unit 54 supplies the depth image information of each viewpoint to the multi-view image encoding unit 55.

The multi-view image encoding unit 55 encodes the multi-view corrected color image from the multi-view color image correction unit 52 and the multi-view depth image from the multi-view depth image generation unit 53 according to a scheme conforming to the HEVC (High Efficiency Video Coding) scheme. The HEVC scheme has been published in May 20, 2011, as of August 2011, as a draft in "WD3: Working Draf t3 of High-Efficiency Video Coding", JCTVC-E603_d5 (version 5) by Thomas Wiegand, Woo-jin Han, Benjamin Bross, Jens-Rainer Ohm, and Gary J. Sullivian.

The multi-view image encoding unit 55 performs differential encoding on the depth image information of each viewpoint supplied from the depth image information generation unit 54 for each viewpoint and generates a DPS (Depth Parameter Set) (DRPS) or the like, which is an NAL (Network Abstraction Layer) unit including a differential encoding result. Then, the multi-view image encoding unit 55 transmits a bit stream formed by the encoded multi-view correction color image and multi-view depth image, the DPS, and the like as an encoded stream (encoded bit stream).

Thus, the multi-view image encoding unit 55 can reduce an encoding amount of the depth image information since the multi-view image encoding unit 55 performs the differential encoding on the depth image information and transmits the encoded depth image information. To supply a comfortable 3D image, there is a high probability of the depth image information not being considerably changed between pictures. Therefore, the fact that the differential encoding is performed is efficient in a reduction in the encoding amount.

Since the multi-view image encoding unit 55 transmits the depth image information included in the DPS, it is possible to prevent the same depth image information from being transmitted redundantly as in a case in which the depth image information is included in a slice header to be transmitted. As a result, it is possible to further reduce the encoding amount of the depth image information.

<Example of Configuration of Multi-View Image Encoding Unit>

Figure 3:
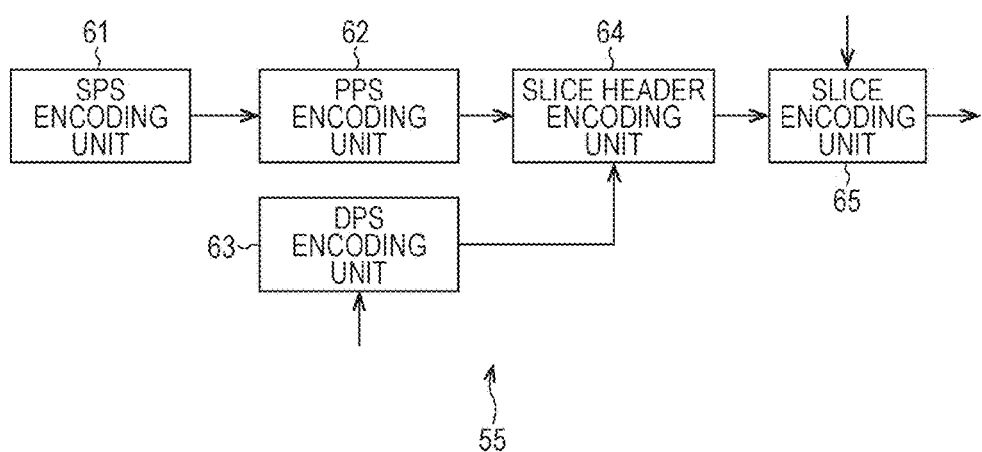
FIG. 3 is a block diagram illustrating an example of the configuration of a multi-view image encoding unit in FIG. 2.

FIG. 3 is a block diagram illustrating an example of the configuration of the multi-view image encoding unit 55 in FIG. 2.

The multi-view image encoding unit 55 in FIG. 3 is configured to include an SPS encoding unit 61, a PPS encoding unit 62, a DPS encoding unit 63, a slice header encoding unit 64, and a slice encoding unit 65.

The SPS encoding unit 61 of the multi-view image encoding unit 55 generates an SPS in a sequence unit and supplies the SPS to the PPS encoding unit 62. The PPS encoding unit 62 generates a PPS in a picture unit, adds the PPS to the SPS supplied from the SPS encoding unit 61, and supplies the added PPS to the slice header encoding unit 64.

The DPS encoding unit 63 performs differential encoding on the depth image information for each slice of the depth image of each viewpoint based on the depth image information of each viewpoint supplied from the depth image information generation unit 54 in FIG. 2. Specifically, when a type of processing target slice is an intra-type, a the DPS encoding unit 63 sets the depth image information of this slice as a differential encoding result without change. Conversely, when the type of processing target slice is an inter-type, the DPS encoding unit 63 sets a difference between the depth image information of this slice and the depth image information of the immediately preceding slice of this slice as a differential encoding result.

The DPS encoding unit 63 functions as a setting unit and sets the differential encoding result in the DPS when the DPS including the differential encoding result of the depth image information is not yet generated. The DPS encoding unit 63 assigns a DPS_id (index identifier) which is an ID (identification number) uniquely identifying the DPS to the DPS and sets the DPS-id in the DPS. Then, the DPS encoding unit 63 supplies the DPS in which the differential encoding result of the depth image information and the DPS_id are set to the slice header encoding unit 64.

Conversely, when the DPS including the differential encoding result of the depth image information is already generated, the DPS encoding unit 63 supplies the DPS_id of the DPS to the slice header encoding unit 64.

The slice header encoding unit 64 functions as a setting unit and sets the DPS_id of the DPS supplied from the DPS encoding unit 63 or a DPS_id in a slice header of the slice of the depth image of the corresponding viewpoint. The slice header encoding unit 64 generates a slice header of the multi-view color image. The slice header encoding unit 64 further adds the DPS supplied from the DPS encoding unit 63 and the slice headers of the multi-view depth image and the multi-view color image to the PPS to which the SPS supplied from the PPS encoding unit 62 is added, and supplies the PPS to the slice encoding unit 65.

The slice encoding unit 65 functions as an encoding unit and encodes the multi-view corrected color image from the multi-view color image correction unit 52 and the multi-view depth image from the multi-view depth image generation unit 53 according to a scheme conforming to the HEVC scheme in the slice unit. At this time, the slice encoding unit 65 uses the depth image information included in the DPS of the DPS_id included in the slice header supplied from the slice header encoding unit 64.

The slice encoding unit 65 generates an encoded stream by adding encoded data of the slice unit obtained as the encoding result to the slice header to which the SPS, the PPS, and the DPS supplied from the slice header encoding unit 64 are added. The slice encoding unit 65 functions as a transmission unit and transmits the encoded stream.

<Example of Structure of Encoded Stream>

Figure 4:
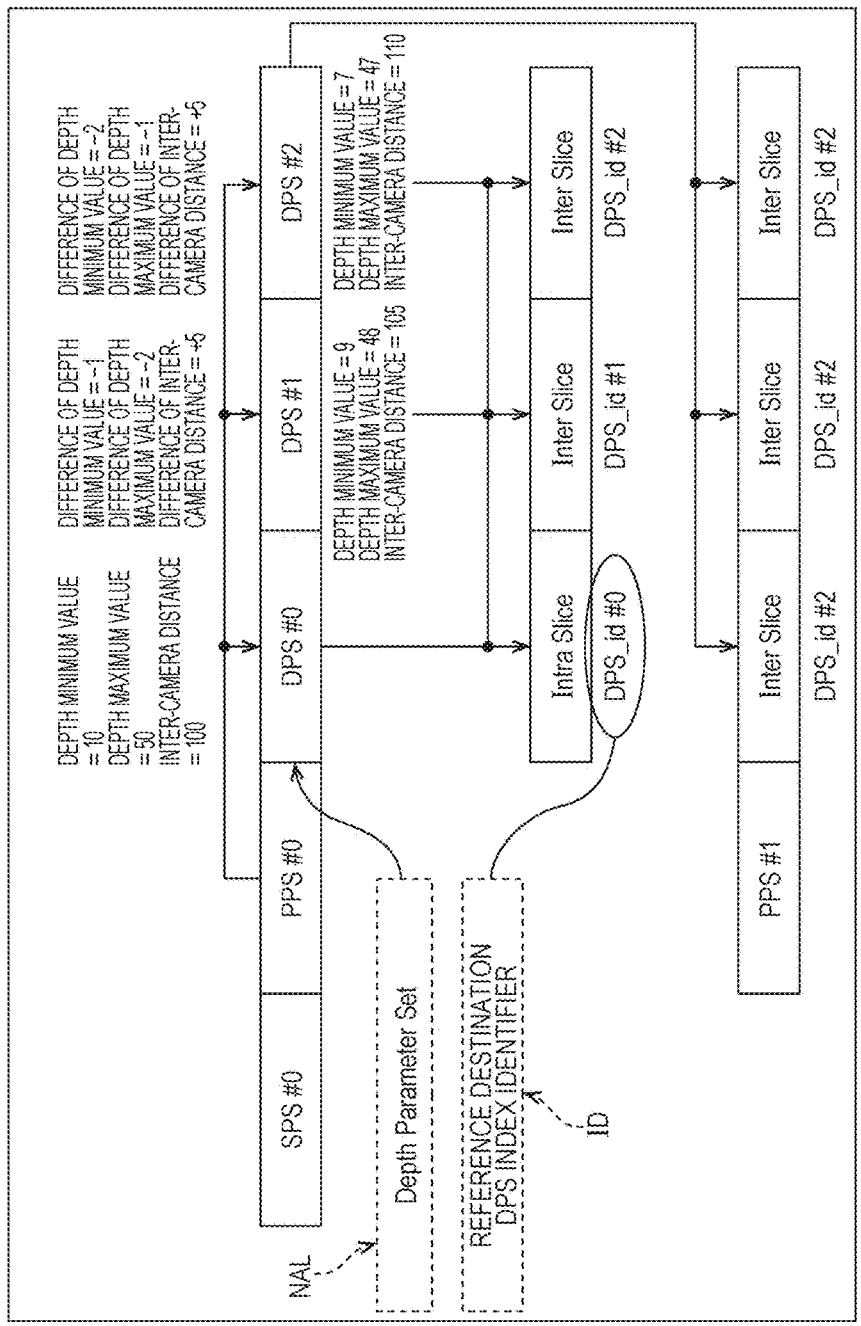
FIG. 4 is a diagram illustrating an example of the structure of an encoded stream.

FIG. 4 is a diagram illustrating an example of the structure of an encoded stream.

In FIG. 4, to facilitate the description, only the encoded data of the slice of the multi-view image is described. However, in practice, the encoded data of the slice of the multi-view color image is also deployed in an encoded stream.

As illustrated in FIG. 4, the encoded data of the slice unit to which the SPS of the sequence unit, the PPS of the picture unit, the DPS of the slice unit, and the slice header are added are sequentially deployed in the encoded stream.

In the example of FIG. 4, the depth minimum value, the depth maximum value, and the inter-camera distance of the intra-type slice among the slices of the picture corresponding to PPS #0 which is the 0th PPS are 10, 50, and 100, respectively. Accordingly, the depth minimum value "10," the depth maximum value "50," and the inter-camera distance "100" themselves are generated as the differential encoding result of the depth image information of the slice. Then, since the DPS including the differential encoding result is not yet generated, the DPS including the differential encoding result is set in the encoded stream and, for example, 0 is assigned as the DPS_id. Then, 0 is included as the DPS_id in the slice header.

In the example of FIG. 4, the depth minimum value, the depth maximum value, and the inter-camera distance of the 1st inter-type slice among the slices of the picture correspond to PPS #0 are 9, 48, and 105, respectively. Accordingly, a difference "−1" obtained by subtracting the depth minimum value "10" of the immediately preceding intra-type slice in the encoding sequence from the depth minimum value "9" of the slice is generated as the differential encoding result of the depth image information of the slice. Likewise, a difference "−2" between the depth maximum values and a difference "5" between the inter-camera distances are generated as the differential encoding result of the depth image information.

Since the DPS including the differential encoding result is not yet generated, the DPS including the differential encoding result is set as the encoded stream and, for example, 1 is assigned as the DPS_id. Then, 1 is included as the DPS_id in the slice header.

In the example of FIG. 4, the depth minimum value, the depth maximum value, and the inter-camera distance of the 2nd inter-type slice among the slices of the picture corresponding to PPS #0 are 7, 47, and 110, respectively. Accordingly, a difference "−2" obtained by subtracting the depth minimum value "9" of the 1st inter-type slice immediately preceding in the encoding sequence from the depth minimum value "7" of the slice is generated as the differential encoding result of the depth image information of the slice. Likewise, a difference "−1" between the depth maximum values and a difference "5" between the inter-camera distances are generated as the differential encoding result of the depth image information.

Since the DPS including the differential encoding result is not yet generated, the DPS including the differential encoding result is set as the encoded stream and, for example, 2 is assigned as the DPS_id. Then, 2 is included as the DPS_id in the slice header.

In the example of FIG. 4, differential encoding results of the depth image information of three inter-type slices of the picture corresponding to PPS #1 which is the 1st PPS are the same as a differential encoding result of the depth image information of the 2nd inter-type slice among the slices of the picture corresponding to PPS #0. Accordingly, the DPS is not set for the three inter-type slices and 2 is included as the DPS_id in the slice header of the slice.

<Example of Syntax of DPS>

FIG. 5 is a diagram illustrating an example of the syntax of the DPS.

As shown in the 2nd line of FIG. 5, a DPS_id (depth_parameter_set_id) assigned to the DPS is included in the DPS. As illustrated in the 14th line, the depth maximum value and the depth minimum value (depth_ranges) are included in the DPS. As illustrated in the 17th line, the inter-camera distance (vsp_param) is included in the DPS.

<Example of Syntax of Slice Header>

FIG. 6 is a diagram illustrating an example of the syntax of the slice header.

As shown in the 3rd line to the 7th line of FIG. 6, a type nal_unit_type of the NAL unit of the encoded data of the slice unit to which the slice header is added is 21 indicating that encoding is performed according to a 3DVC (3-dimensional video encoding) scheme, that is, the slice header is a slice header of a depth image, and when a type slice_type of slice is an inter-type, the slice header includes a flag indicating whether weighted prediction is performed on the depth image.

Specifically, when the type slice_type of slice is P (slice_type==P), the slice header includes a flag depth_weighted_pred_flag indicating whether the weighted prediction in a front or rear direction is performed. On the other hand, when type slice_type of slice is B (slice_type==B), the slice header includes a flag depth_weighted_bipred_flag indicating whether the weighted prediction in the front and rear directions is performed.

As shown in the 8th line to the 10th line, when the weighted prediction is performed, the slice header includes a DPS_id (depth_parameter_set_id). Specifically, when the type slice_type of slice is P and the flag depth_weighted_pred_flag is 1 or when the type slice_type of slice is B and the flag depth_weighted_bipred_flag is 1, the DPS_id (depth_parmeter_set_id) is included.

Although not illustrated, when the type nal_unit_type of the NAL unit of the encoded data of the slice is a value of 21, the DPS_id is included in spite of the fact that the type slice_type of slice is I.

The syntax of FIG. 6 is the same as the syntax of the existing slice header except for the description of the case in which the type nal_unit_type of the NAL unit in the 3rd line to the 10th line is 21. That is, information other than the flag depth_weighted_pred_flag or the flag depth_weighted_bipred_flag, and the DPS_id in the slice header of the depth image is the same as information in the slice header of the color image. Accordingly, compatibility with the existing encoded stream can be completely maintained.

Since the slice header includes the flag depth_weighted_pred_flag and the flag depth_weighted_bipred_flag, the flag depth_weighted_pred_flag or the flag depth_weighted_bipred_flag can be set in the slice unit.

<Description of Process of Encoding Device>

Figure 7:
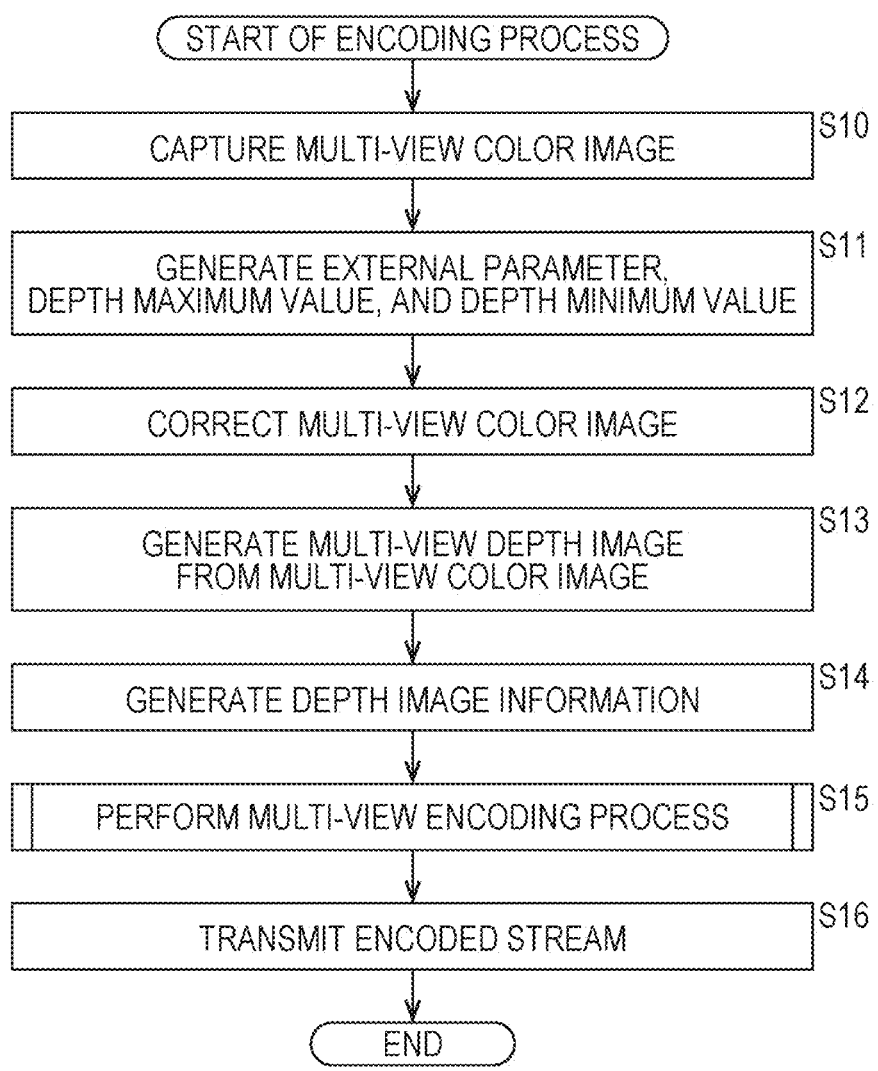
FIG. 7 is a flowchart illustrating an encoding process of the encoding device in FIG. 2.

FIG. 7 is a flowchart illustrating an encoding process of the encoding device 50 in FIG. 2.

In step S10 of FIG. 7, the multi-view color image capturing unit 51 of the encoding device 50 captures a color image of multi-views and supplies the color image of multi-views as a multi-view color image to the multi-view color image correction unit 52.

In step S11, the multi-view color image capturing unit 51 generates the extrinsic parameter, the depth maximum value, and the depth minimum value of each viewpoint. The multi-view color image capturing unit 51 supplies the extrinsic parameter, the depth maximum value, and the depth minimum value to the depth image information generation unit 54 and supplies the depth maximum value and the depth minimum value to the multi-view depth image generation unit 53.

In step S12, the multi-view color image correction unit 52 performs the color correction, the luminance correction, and the distortion correction, and the like on the multi-view color image supplied from the multi-view color image capturing unit 51. The multi-view color image correction unit 52 supplies the multi-view color image after the correction as the multi-view corrected color image to the multi-view depth image generation unit 53 and the multi-view image encoding unit 55.

In step S13, the multi-view depth image generation unit 53 generates the depth image of the multi-views from the multi-view corrected color image supplied from the multi-view color image correction unit 52 based on the depth maximum value and the depth minimum value supplied from the multi-view color image capturing unit 51. Then, the multi-view depth image generation unit 53 supplies the generated depth image of the multi-views as the multi-view depth image to the multi-view image encoding unit 55.

In step S14, the depth image information generation unit 54 generates the depth image information of each viewpoint and supplies the depth image information of each viewpoint to the multi-view image encoding unit 55.

In step S15, the multi-view image encoding unit 55 performs the multi-view encoding process of encoding the multi-view corrected color image and the multi-view depth image according to a scheme conforming to the HEVC scheme. The details of the multi-view encoding process will be described with reference to FIG. 8 to be described below.

In step S16, the multi-view image encoding unit 55 transmits the encoded stream generated as the result of step S15 and ends the process.

Figure 8:
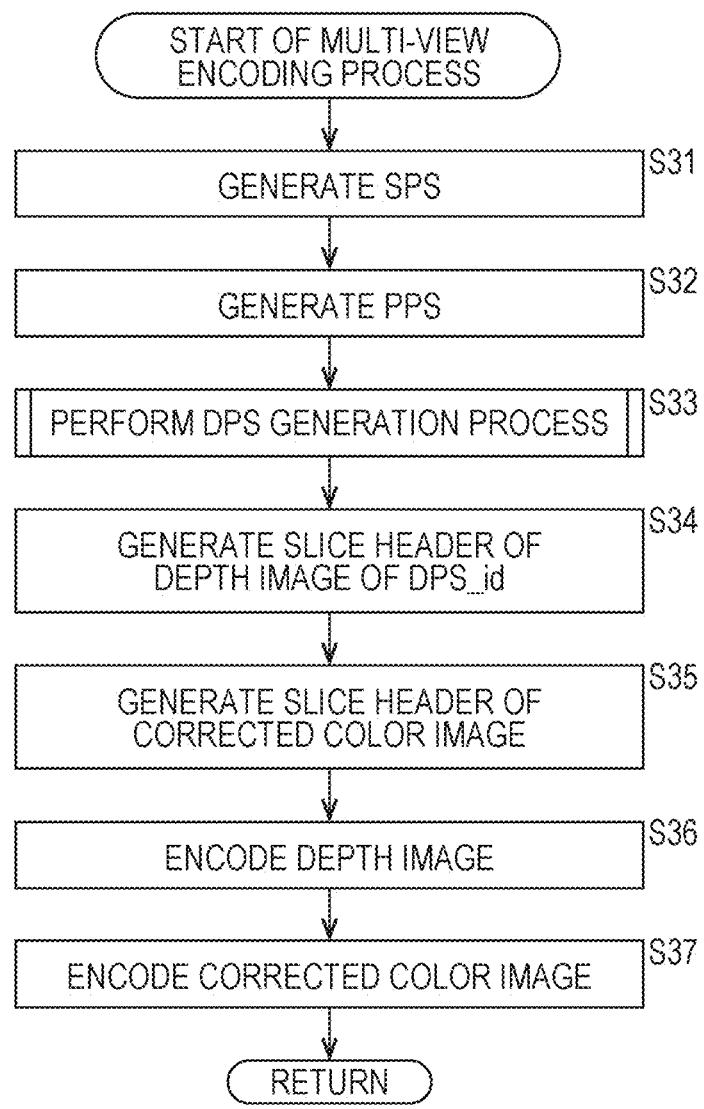
FIG. 8 is a flowchart illustrating details of a multi-view encoding process in FIG. 7.

FIG. 8 is a flowchart illustrating the details of the multi-view encoding process of step S15 of FIG. 7.

In step S31 of FIG. 8, the SPS encoding unit 61 (FIG. 3) of the multi-view image encoding unit 55 generates the SPS of the sequence unit and supplies the SPS to the PPS encoding unit 62.

In step S32, the PPS encoding unit 62 generates the PPS of the picture unit, adds the PPS to the SPS supplied from the SPS encoding unit 61, and supplies the SPS to the slice header encoding unit 64. The subsequent processes of step S33 to step S37 are performed in the slice unit of each viewpoint.

In step S33, the DPS encoding unit 63 performs the DPS generation process of generating the DPS of the slice of a processing target viewpoint (hereinafter referred to as a target viewpoint slice). The details of the DPS generation process will be described with reference to FIG. 9 to be described below.

In step S34, the slice header encoding unit 64 generates a slice header of the depth image of the target viewpoint slice including the DPS_id of the DPS supplied from the DPS encoding unit 63 or a DPS_id.

In step S35, the slice header encoding unit 64 generates the slice header of the corrected color image of the target viewpoint slice. Then, the slice header encoding unit 64 further adds the DPS, the multi-view depth image, and the slice header of the multi-view color image to the PPS to which the SPS supplied from the PPS encoding unit 62 is added and supplies the PPS to the slice encoding unit 65.

In step S36, the slice encoding unit 65 encodes the depth image of the target viewpoint slice supplied from the multi-view depth image generation unit 53 based on the depth image information included in the DPS of the DPS_id included in the slice header of the depth image of the target viewpoint slice supplied from the slice header encoding unit 64 according to a 3DVC scheme conforming to the HEVC scheme.

In step S37, the slice encoding unit 65 encodes the corrected color image of the target viewpoint slice supplied from the multi-view depth image generation unit 53 according to a scheme conforming to the HEVC scheme. The slice encoding unit 65 generates the encoded stream by adding the encoded data of the slice unit obtained as the encoding results of step S36 and step S37 to the slice header to which the SPS, the PPS, and the DPS are added and which is supplied from the slice header encoding unit 64. Then, the process returns to step S15 of FIG. 7 and proceeds to step S16.

Figure 9:
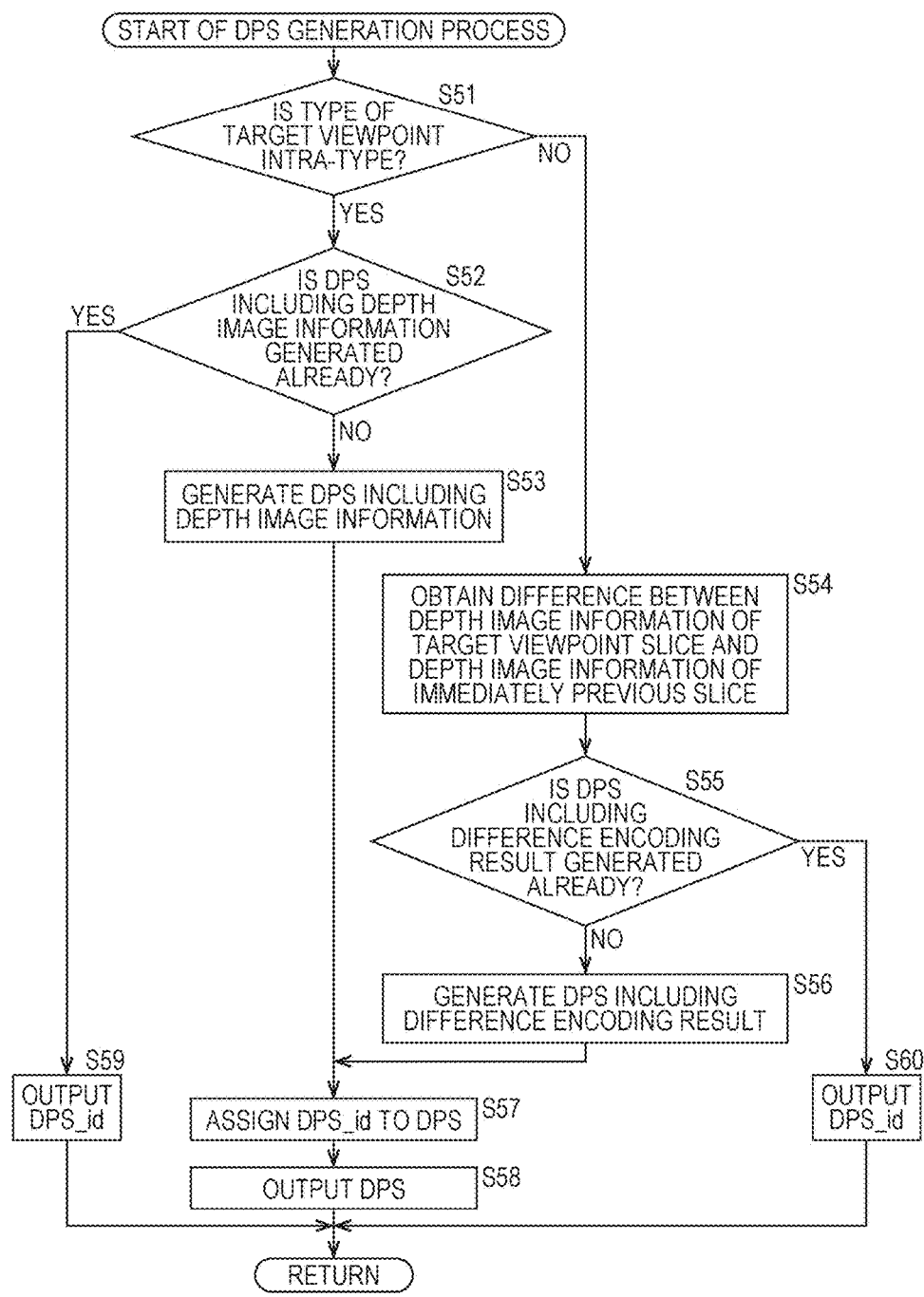
FIG. 9 is a flowchart illustrating details of a DPS generation process of FIG. 8.

FIG. 9 is a flowchart illustrating the details of the DPS generation process of step S33 of FIG. 8.

In step S51 of FIG. 9, the DPS encoding unit 63 determines whether a type of target viewpoint slice is the intra-type. When it is determined in step S51 that the type of target viewpoint slice is the intra-type, the process proceeds to step S52.

In step S52, the DPS encoding unit 63 determines whether the DPS including the depth image information of the target viewpoint slice supplied from the depth image information generation unit 54 in FIG. 2 is already generated.

When it is determined in step S52 that the DPS is not already generated, the DPS encoding unit 63 generates the DPS including the depth image information of the target viewpoint slice as the differential encoding result in step S53 and the process proceeds to step S57.

Conversely, when it is determined in step S51 that the type of target viewpoint slice is not the intra-type, that is, the type of target viewpoint slice is the inter-type, the process proceeds to step S54.

In step S54, the DPS encoding unit 63 performs the differential encoding by obtaining, as the differential encoding result, a difference between the depth image information of the target viewpoint slice and the depth image information of the slice of the same viewpoint immediately preceding in the encoding sequence of the target viewpoint slice.

In step S55, the DPS encoding unit 63 determines whether the DPS including the differential encoding result obtained in step S54 is already generated. When it is determined in step S55 that the DPS is not already generated, the DPS encoding unit 63 generates the DPS including the differential encoding result obtained in step S54 in step S56 and the process proceeds to step S57.

In step S57, the DPS encoding unit 63 assigns the DPS_id to the DPS generated in step S53 or step S56 and allows the DPS_id to be included in the DPS. The DPS encoding unit 63 retains the DPS including the DPS_id. The retained DPS is used at the time of determination of step S52 and step S55.

In step S58, the DPS encoding unit 63 outputs the DPS including the DPS_id to the slice header encoding unit 64. Then, the process returns to step S33 of FIG. 8 and proceeds to step S34.

Conversely, when it is determined in step S52 that the DPS is already generated, the DPS encoding unit 63 detects the DPS_id of the DPS from the DPS retained in step S57 and outputs the DPS_id to the slice header encoding unit 64 in step S59. Then, the process returns to step S33 of FIG. 8 and proceeds to step S34.

Conversely, when it is determined in step S55 that the DPS is already generated, the DPS encoding unit 63 detects the DPS_id of the DPS from the DPS retained in step S57 and outputs the DPS_id to the slice header encoding unit 64 in step S60. Then, the process returns to step S33 of FIG. 8 and proceeds to step S34.

As described above, since the encoding device 50 sets the depth image information in the DPS, allows the depth image information to be included in the encoded stream, and transmits the encoded stream, the depth image information can be shared between the slices. As a result, redundancy of the depth image information can be decreased more than when the depth image information is included in the slice header or the like to be transmitted, and thus it is possible to reduce the encoding amount.

Since the depth image information in the DPS is set different from an existing parameter set, an SPS and a PPS, and generates the encoded stream, the encoding device 50 can generate the encoded stream with compatibility with an existing encoded stream.

Further, when the encoding device 50 assigns the DPS_id in the setting sequence of the DPS, a decoding side can detect that the DPS is lost during the transmission based on the DPS_id included in the DPS. Accordingly, in this case, the encoding device 50 can perform the transmission with high error tolerance.

In the encoding device 50, the multi-view depth image is generated from the multi-view corrected color image. However, when the multi-view color image is captured, the multi-view depth image may be generated by a sensor that detects the disparity d and the depth Z.

<Example of Configuration of Decoding Device of Embodiment>

Figure 10:
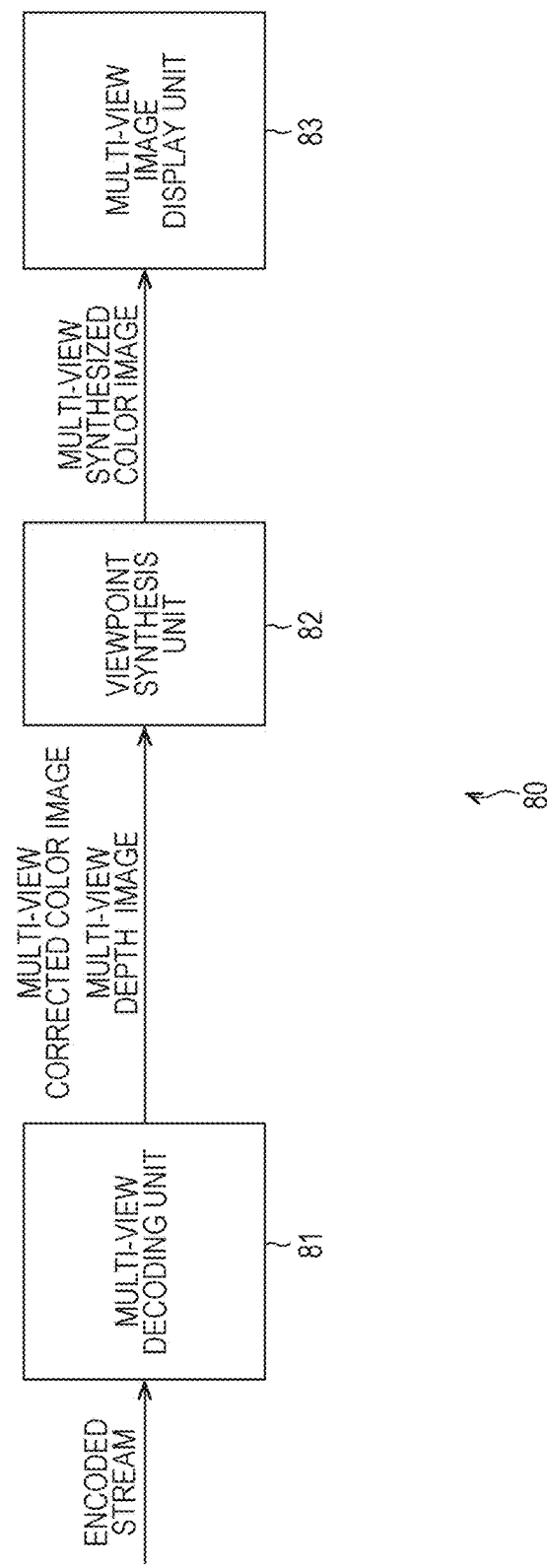
FIG. 10 is a block diagram illustrating an example of the configuration of a decoding device of an embodiment to which the present technology is applied.

FIG. 10 is a block diagram illustrating an example of the configuration of a decoding device decoding an encoded stream transmitted from the encoding device 50 in FIG. 2 according to an embodiment to which the present technology is applied.

The decoding device 80 in FIG. 10 is configured to include a multi-view image decoding unit 81, a viewpoint synthesis unit 82, and a multi-view image display unit 83.

The multi-view image decoding unit 81 of the decoding device 80 receives the encoded stream transmitted from the encoding device 50 in FIG. 2. The multi-view image decoding unit 81 extracts the SPS, the PPS, the DPS, the slice header, the encoded data of the slice unit, and the like from the acquired encoded stream. Then, the multi-view image decoding unit 81 decodes the encoded data of the depth image of the slice corresponding to the slice header based on the DPS specified by the DPS_id included in the slice header for each viewpoint according to a scheme corresponding to the encoding scheme of the multi-view image encoding unit 55 in FIG. 2 to generate the depth image. The multi-view image decoding unit 81 decodes the encoded data of the slice unit of the multi-view color image according to the scheme corresponding to the encoding scheme of the multi-view image encoding unit 55 to generate the multi-view corrected color image. The multi-view image decoding unit 81 supplies the generated multi-view corrected color image and multi-view depth image to the viewpoint synthesis unit 82.

The viewpoint synthesis unit 82 performs a warping process (the details of which will be described below) to viewpoints (hereinafter referred to as display viewpoints) of the number of viewpoints corresponding to the multi-view image display unit 83 on the multi-view depth image from the multi-view image decoding unit 81. At this time, the depth image information may be set to be used.

The warping process is a process of performing geometric transform from an image of a given viewpoint to an image of another viewpoint. The display viewpoints include viewpoint other than the viewpoint corresponding to the multi-view color image.

The viewpoint synthesis unit 82 performs the warping process to the display viewpoints on the multi-view corrected color image supplied from the multi-view image decoding unit 81 based on the depth image of the display viewpoints obtained as the result of the warping process. At this time, the depth image information may be set to be used. The viewpoint synthesis unit 82 supplies the color image of the display viewpoints obtained as the result of the warping process as a multi-view synthesized color image to the multi-view image display unit 83.

The multi-view image display unit 83 displays the multi-view synthesized color image supplied from the viewpoint synthesis unit 82 so that a viewable angle is different at each viewpoint. A viewer can view a 3D image from a plurality of viewpoints without wearing glasses merely by viewing images of two arbitrary viewpoints with left and right eyes, respectively.

<Example of Configuration of Multi-View Image Decoding Unit>

Figure 11:
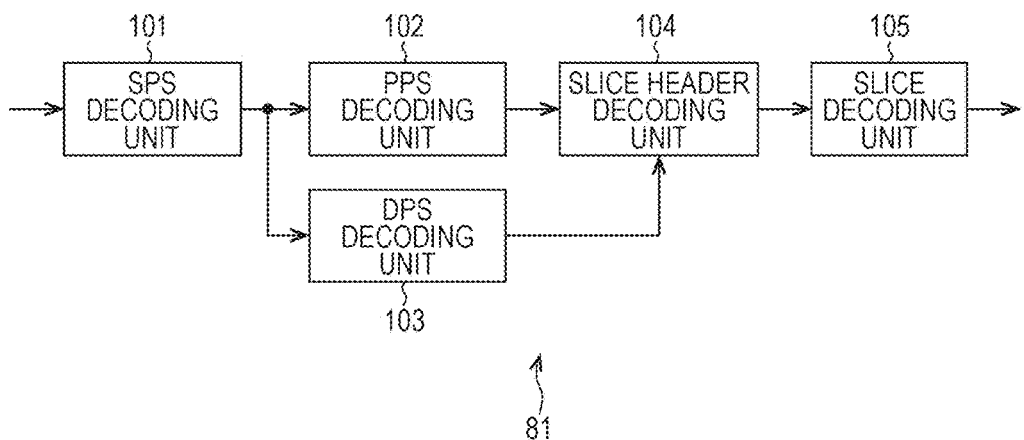
FIG. 11 is a block diagram illustrating an example of the configuration of a multi-view image decoding unit in FIG. 10.

FIG. 11 is a block diagram illustrating an example of the configuration of the multi-view image decoding unit 81 in FIG. 10.

The multi-view image decoding unit 81 in FIG. 11 is configured to include an SPS decoding unit 101, a PPS decoding unit 102, a DPS decoding unit 103, a slice header decoding unit 104, and a slice decoding unit 105.

The SPS decoding unit 101 of the multi-view image decoding unit 81 receives the encoded stream transmitted from the encoding device 50 in FIG. 2. The SPS decoding unit 101 extracts the SPS from the encoded stream. The SPS decoding unit 101 supplies the extracted SPS and the encoded stream to the PPS decoding unit 102 and the DPS decoding unit 103.

The PPS decoding unit 102 extracts the PPS from the encoded stream supplied from the SPS decoding unit 101. The PPS decoding unit 102 supplies the extracted PPS and the encoded stream supplied from the SPS decoding unit 101 to the slice header decoding unit 104. The DPS decoding unit 103 functions as an acquisition unit and acquires the DPS from the encoded stream supplied from the SPS decoding unit 101. The DPS decoding unit 103 functions as a parsing processing unit, and parses (extracts) and retains the depth image information from the DPS. The depth image information is supplied to the viewpoint synthesis unit 82, as necessary.

The slice header decoding unit 104 extracts the slice header from the encoded stream supplied from the PPS decoding unit 102. The slice header decoding unit 104 reads the depth image information of the DPS specified by the DPS_id included in the slice header from the DPS decoding unit 103. The slice header decoding unit 104 supplies the SPS, the PPS, the slice header, the DPS, and the encoded stream to the slice decoding unit 105.

The slice decoding unit 105 functions as the acquisition unit and acquires the encoded data of the slice unit from the encoded stream supplied from the slice header decoding unit 104. The slice decoding unit 105 functions as a generation unit and decodes the differential encoding result included in the DPS supplied from the slice header decoding unit 104 based on the slice type of slice corresponding to the DPS.

Specifically, when the slice type of slice corresponding to the DPS is the intra-type, the slice decoding unit 105 performs decoding using the differential encoding result included in the DPS as the decoding result without change. On the other hand, when the slice type of slice corresponding to the DPS is the inter-type, the slice decoding unit 105 adds the differential encoding result included in the DPS and the retained depth image information of the slice immediately preceding in the encoding sequence and sets the added value obtained as the addition result as a decoding result. The slice decoding unit 105 retains the decoding result as the depth image information.

The slice decoding unit 105 decodes the encoded data of the slice unit based on the SPS, the PPS, the slice header, and the depth image information supplied from the slice header decoding unit 104 according to a scheme corresponding to the encoding scheme in the slice encoding unit 65 (FIG. 3). The slice header decoding unit 104 supplies the multi-view corrected color image and the multi-view depth image obtained as the decoding result to the viewpoint synthesis unit 82 in FIG. 10.

<Description of Process of Decoding Device>

Figure 12:
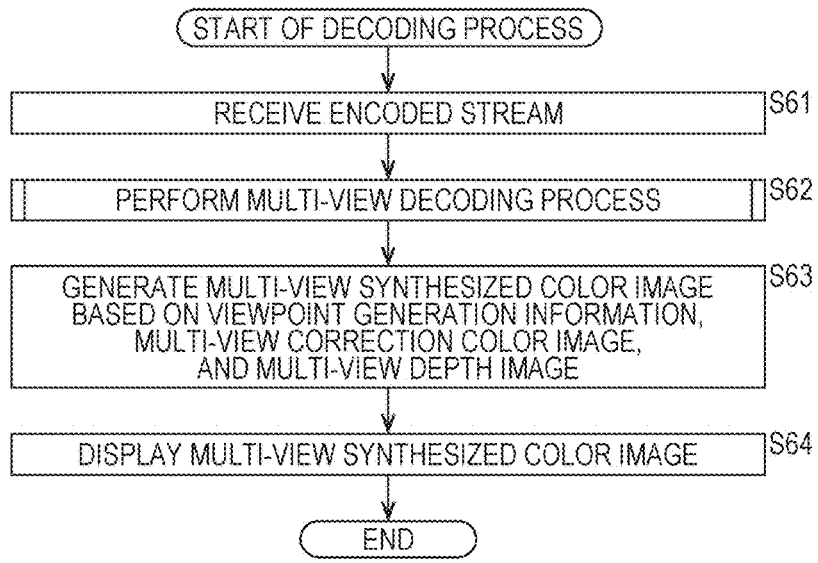
FIG. 12 is a flowchart illustrating a decoding process of the decoding device in FIG. 10.

FIG. 12 is a flowchart illustrating a decoding process of the decoding device 80 in FIG. 10. The decoding process starts, for example, when the encoded stream is transmitted from the encoding device 50 in FIG. 2.

In step S61 of FIG. 12, the multi-view image decoding unit 81 of the decoding device 80 receives the encoded stream transmitted from the encoding device 50 in FIG. 2.

In step S62, the multi-view image decoding unit 81 performs a multi-view decoding process of decoding the received encoded stream. The details of the multi-view decoding process will be described with reference to FIG. 13 to be described below.

In step S63, the viewpoint synthesis unit 82 generates the multi-view synthesized color image based on the multi-view corrected color image and the multi-view depth image supplied from the multi-view image decoding unit 81.

In step S64, the multi-view image display unit 83 displays the multi-view synthesized color image supplied from the viewpoint synthesis unit 82 so that a viewable angle is different at each viewpoint and ends the process.

FIG. 13 is a flowchart illustrating the details of the multi-view decoding process of step S62 of FIG. 12.

In step S71 of FIG. 13, the SPS decoding unit 101 of the multi-view image decoding unit 81 extracts the SPS from the received encoded stream. The SPS decoding unit 101 supplies the extracted SPS and the encoded stream to the PPS decoding unit 102 and the DPS decoding unit 103.

In step S72, the PPS decoding unit 102 extracts the PPS from the encoded stream supplied from the SPS decoding unit 101. The PPS decoding unit 102 supplies the extracted PPS, and the SPS and the encoded stream supplied from the SPS decoding unit 101 to the slice header decoding unit 104.

In step S73, the DPS decoding unit 103 extracts the DPS from the encoded stream supplied from the SPS decoding unit 101, and parses and retains the depth image information from the DPS. The subsequent processes of step S74 to step S77 are performed in the slice unit of each viewpoint. In step S74, the slice header decoding unit 104 extracts the slice header of the target viewpoint slice from the encoded stream supplied from the PPS decoding unit 102.

In step S75, the slice header decoding unit 104 reads the depth image information of the DPS specified by the DPS_id included in the slice header extracted in step S74 from the DPS decoding unit 103. The slice header decoding unit 104 supplies the SPS, the PPS, the slice header and the DPS of the target viewpoint slice, and the encoded stream to the slice decoding unit 105.

In step S76, the slice decoding unit 105 decodes the differential encoding result included in the DPS supplied from the slice header decoding unit 104 and performs a generation process of generating the depth image information. The details of the generation process will be described with reference to FIG. 14 to be described below.

In step S77, the slice decoding unit 105 extracts the encoded data of the target viewpoint slice from the encoded stream supplied from the slice header decoding unit 104.

In step S78, the slice decoding unit 105 decodes the encoded data of the target viewpoint slice based on the SPS, the PPS, and the slice header supplied from the slice header decoding unit 104 and the depth image information according to the scheme corresponding to the encoding scheme in the slice encoding unit 65 (FIG. 3). The slice decoding unit 105 supplies the corrected color image and the depth image obtained as the decoding result to the viewpoint synthesis unit 82 in FIG. 10. Then, the process returns to step S62 of FIG. 12 and proceeds to step S63.

FIG. 14 is a flowchart illustrating the details of the generation process of step S76 of FIG. 13.

In step S91, the slice decoding unit 105 determines whether the type of target viewpoint slice is the intra-type. When it is determined in step S91 that the type of target viewpoint slice is the intra-type, the process proceeds to step S92.

In step S92, the slice decoding unit 105 retains the differential encoding result of the depth minimum value included in the DPS supplied from the slice header decoding unit 104 along with the depth minimum value of the depth image information of the decoding result.

In step S93, the slice decoding unit 105 retains the differential encoding result of the depth maximum value included in the DPS supplied from the slice header decoding unit 104 along with the depth maximum value of the depth image information of the decoding result.

In step S94, the slice decoding unit 105 retains the differential encoding result of the inter-camera distance included in the DPS supplied from the slice header decoding unit 104 along with the inter-camera distance of the depth image information of the decoding result. Then, the process returns to step S76 of FIG. 13 and proceeds to step S77.

Conversely, when it is determined in step S91 that the type of target viewpoint slice is not the intra-type, that is, the type of target viewpoint slice is the inter-type, the process proceeds to step S95.

In step S95, the slice decoding unit 105 performs the decoding by adding the differential encoding result of the depth minimum value included in the DPS supplied from the slice header decoding unit 104 to the retained depth minimum value of the slice immediately preceding in the encoding sequence. The slice decoding unit 105 retains the depth minimum value of the depth image information obtained as the decoding result.

In step S96, the slice decoding unit 105 performs the decoding by adding the differential encoding result of the depth maximum value included in the DPS supplied from the slice header decoding unit 104 to the retained depth maximum value of the slice immediately preceding in the encoding sequence. The slice decoding unit 105 retains the depth maximum value of the depth image information obtained as the decoding result.

In step S97, the slice decoding unit 105 performs the decoding by adding the differential encoding result of the inter-camera distance included in the DPS supplied from the slice header decoding unit 104 to the retained inter-camera distance of the slice immediately preceding in the encoding sequence. The slice decoding unit 105 retains the inter-camera distance of the depth image information obtained as the decoding result. Then, the process returns to step S76 of FIG. 13 and proceeds to step S77.

As described above, the decoding device 80 can decode the encoded steam of which the encoding amount is reduced by setting the depth image information in the DPS. Also, since the depth image information is included in the encoded stream, the decoding device 80 can decode the encoded stream used at the time of the encoding of the depth image information.

Since the depth image information can be included in the DPS different from the existing parameter sets, the SPS and the PPS, it is possible to easily use the depth image information at the time of a post process such as a warping process. Further, since the DPS is collectively arranged before the encoded data of the slice unit, the viewpoint synthesis unit 82 can collectively acquire the depth image information before the decoding.

The depth image information may not be used in the encoding or the decoding of the multi-view depth image.

In the above-described embodiment, the DPS_id is included in the slice header. However, for example, when the depth image information is set in a sequence unit (GOP (group of pictures) unit), an existing SPS may be extended and the DPS_id may be included in the extended SPS (hereinafter referred to as an extended SPS).

In this case, the syntax of the extended SPS is shown in, for example, FIG. 15. That is, the extended SPS includes a flag depth_range_present_flag (identification information) identifying the fact that the DPS is present, as shown in the 2nd line, and includes DPS_id (depth_parameter_set_id) when the flag depth_range_present_flag is 1, as shown in the 3rd line.

In this case, as shown in the 5th line and the 6th line of FIG. 16, a flag depth_weighted_pred_flag and a flag depth_weighted_bipred_flag can also be set in a sequence unit and be included in the extended SPS.

Also, an existing slice header can be extended rather than an existing SPS and the DPS_id can be included in an extended slice header (hereinafter referred to as an extended slice header).

In this case, for example, slice_layer is extended. Thus, as illustrated in FIG. 17, an NAL unit in which the type of NAL unit nal_unit_type is 21, that is, slice_layer (slice_layer_3dvc_extension_rbsp) (hereinafter referred to as an extended slice_layer) extended as slice_layer of the NAL unit of the encoded data encoded according to a 3DVC scheme, is defined. As illustrated in FIG. 17, the type of NAL unit nal_unit_type of the DPS is 16 which is different from that of an existing NAL unit such as the SPS or the PPS.

As illustrated in FIG. 18, the encoded data of the extended slice_layer (slice_layer_3dvc_extension_rbsp) is defined as including an extended slice header (slice_header_3dvc_extension) and an encoded data (slice_data) of the slice unit.

The syntax of the extended slice header (slice_header_3dvc_extension) is illustrated in, for example, FIG. 19. That is, as shown in the 2nd line to the 4th line of FIG. 19, the extended slice header (slice_header_3dvc_extension) includes not only the existing slice header (slice_header) but also the DPS_id (depth_parameter_set_id) when the flag depth_weighted_pred_flag or depth_weighted_bipred_flag is 1.

The extended slice header (slice_header_3dvc_extension) may include the flag depth_weighted_pred_flag or depth_weighted_bipred_flag, as illustrated in FIG. 20.

As illustrated in FIG. 19 or 20, since the existing slice header is included in the extended slice header, it is possible to completely maintain compatibility with the existing encoded stream.

As illustrated in FIGS. 17 and 18, slice_layer is not extended, but the extended slice header (slice_header_3dvc_extension) can also be defined with the existing slice_layer.

In this case, as shown in the 15th line and the 16th line of FIG. 21, when the type of NAL unit nal_unit_type is 21, the NAL unit includes a flag 3dvc_extension_flag indicating whether the type of NAL unit is an NAL unit for the 3DVC scheme.

As shown in the 6th line to the 8th line of FIG. 22, when the flag 3dvc_extension_flag is 1 which indicates the NAL unit for the 3DVC scheme, the encoded data of slice_layer is defined as including an extended slice header (slice_header_3dvc_extension) and the encoded data (slice_data) of the slice unit.

In the above-described embodiment, as illustrated in FIG. 4, the DPS is shared between the slices and the slice header includes the DPS_id of the DPS of the corresponding slice. However, as illustrated in FIG. 23, the DPS may be set for each slice and the DPS may be added to the encoded data of each slice. In this case, the DPS_id is not assigned to the DPS and the DPS_id is not included in the slice header.

<Description of Computer to which the Present Technology is Applied>

Next, the above-described series of processes may be performed by hardware or may be performed by software. When the series of processes are performed by software, a program for the software is installed in a general-purpose computer or the like.

Figure 24:
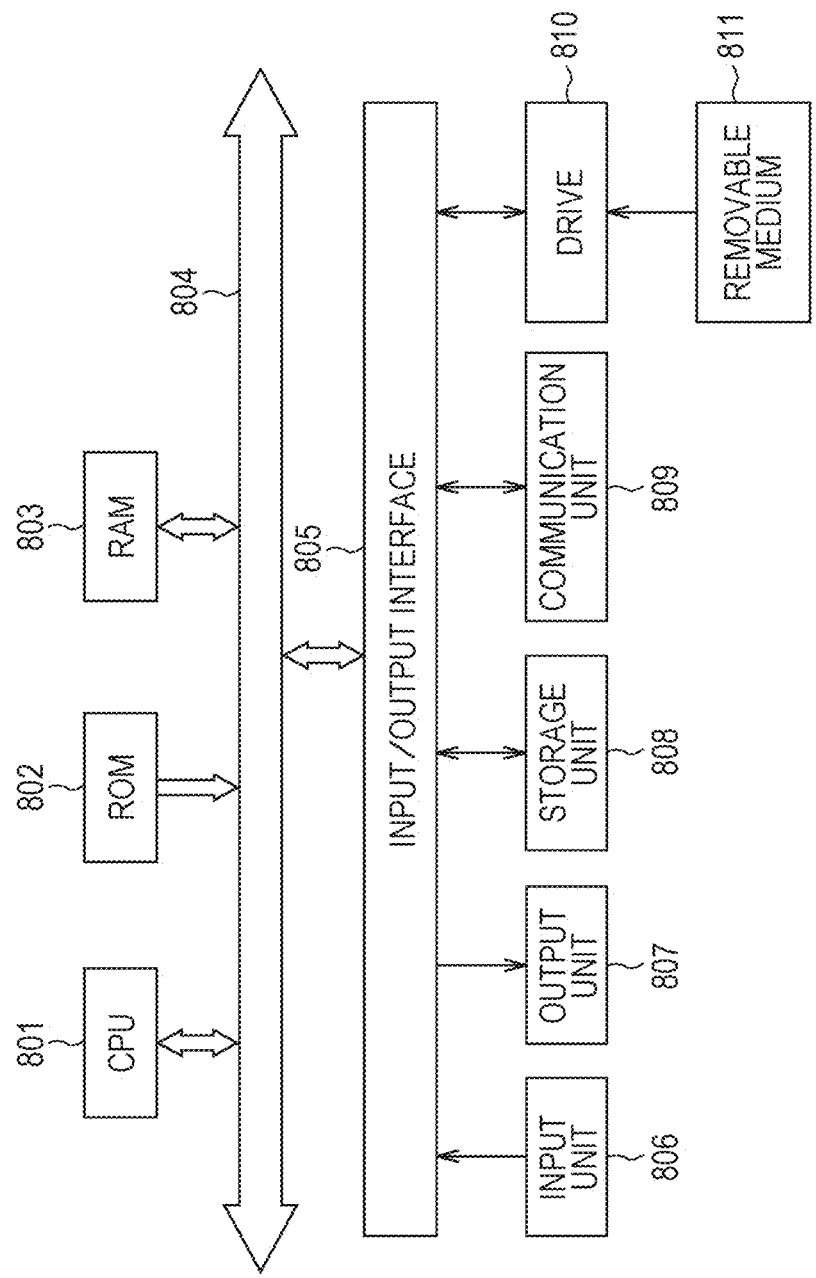
FIG. 24 is a diagram illustrating an example of the configuration of a computer of an embodiment.

Here, FIG. 24 illustrates an example of the configuration of a computer of an embodiment in which the program performing the above-described series of processes is installed.

The program can be recorded in advance in a storage unit 808 or a ROM (Read-Only Memory) 802 serving as a recording medium included in the computer.

Alternatively, the program can also be stored (recorded) in a removable medium 811. The removable medium 811 can be provided as so-called package software. Here, examples of the removable medium 811 includes a flexible disk, a CD-ROM (Compact Disc Read Only Memory), an MO (Magneto Optical) disc, a DVD (Digital Versatile Disc), a magnetic disk, and semiconductor memory.

The program can be installed in a computer from the above-described removable medium 811 via a drive 810 and can also be downloaded to a computer via a communication network or a broadcasting network to be installed in an included storage unit 808. That is, for example, the program can be transmitted to a computer in a wireless manner from a download site via an artificial satellite for digital satellite broadcasting or can be transmitted to a computer in a wired manner via a network such as a LAN (Local Area Network) or the Internet.

A computer includes a CPU (Central Processing Unit) 801. An input/output interface 805 is connected to the CPU 801 via a bus 804.

When a user manipulates an input unit 806 to input an instruction via the input/output interface 805, the CPU 801 executes a program stored in the ROM 802 according to the instruction. Alternatively, the CPU 801 loads a program stored in the storage unit 808 to a RAM (Random Access Memory) 803 and executes the program.

Accordingly, the CPU 801 performs processes in accordance with the above-described flowcharts or processes performed by the above-described configurations of the block diagrams. Then, the CPU 801 outputs the processing results from an output unit 807, transmits the processing results from a communication unit 809, or records the processing results in the storage unit 808, for example, via the input/output interface 805, as necessary.

The input unit 806 is configured to include a keyboard, a mouse, and microphone. The output unit 807 is configured to include an LCD (Liquid Crystal Display) or a speaker.

Here, in the present specification, the processes performed according to the program by the computer may not necessarily be performed chronologically according to the orders described in the flowcharts. That is, the processes performed according to the program by the computer also include processes (for example, parallel processes or processes by objects) performed in parallel or individually.

The program may be processed by a single computer (processor) or may be processed in a distributed manner by a plurality of computer. The program may be transmitted to a computer located at a remote place to be executed.

The present technology can be applied to an encoding device or a decoding device used when communication is performed via a network medium such as satellite broadcasting, a cable TV (television), the Internet, and a portable telephone or when processing is performed on a storage medium such as an optical disc, a magnetic disk, and a flash memory.

The encoding device and the decoding device described above can be applied to any electronic apparatus. Examples of the electronic apparatuses will be described below.

<Example of Configuration of Television Apparatus>

Figure 25:
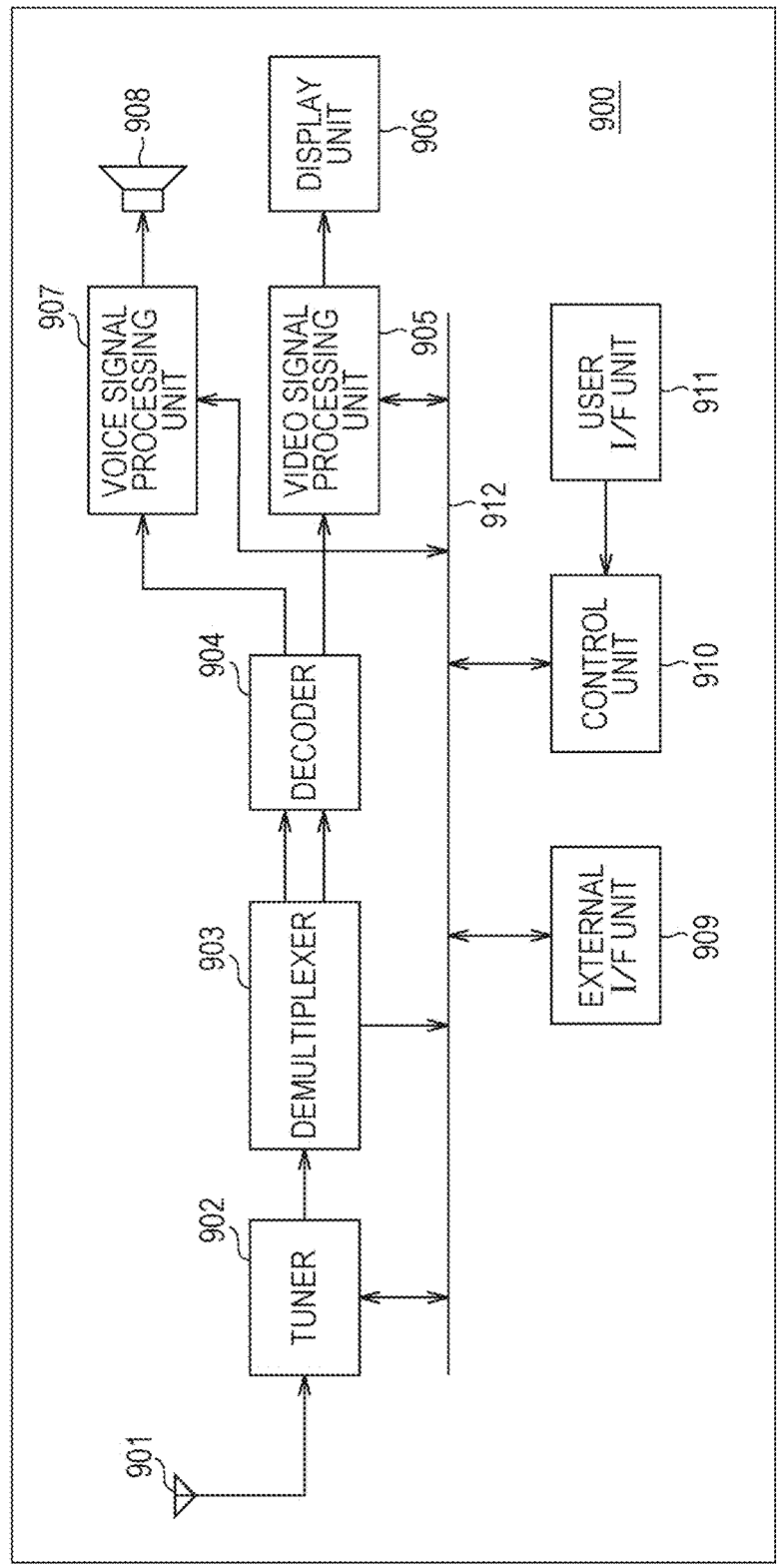
FIG. 25 is a diagram illustrating an example of an overall configuration of a television apparatus to which the present technology is applied.

FIG. 25 exemplifies an overall configuration of a television apparatus to which the present technology is applied. A television apparatus 900 includes an antenna 901, a tuner 902, a demultiplexer 903, a decoder 904, a video signal processing unit 905, a display unit 906, a voice signal processing unit 907, a speaker 908, and an external interface unit 909. The television apparatus 900 further includes a control unit 910 and a user interface unit 911.

The tuner 902 tunes a desired channel from a broadcast wave signal received by the antenna 901, performs demodulation, and outputs an obtained encoded stream to the demultiplexer 903.

The demultiplexer 903 extracts a packet of a video or a voice of a program to be viewed from the encoded stream and outputs data of the extracted packet to the decoder 904. The demultiplexer 903 supplies a packet of data such as EPG (Electronic Program Guide) to the control unit 910. When scrambling is performed, the scrambling is cancelled by the demultiplexer or the like.

The decoder 904 performs a decoding process on the packet and outputs video data and voice data generated through the decoding process to the video signal processing unit 905 and the voice signal processing unit 907, respectively.

The video signal processing unit 905 performs noise removal or video processing or the like according to user setting on the video data. The video signal processing unit 905 generates video data of a program to be displayed on the display unit 906 or generates image data through a process based on an application supplied via a network. The video signal processing unit 905 generates video data for displaying a menu screen or the like for selection or the like of items and overlaps the video data with the video data of the program. The video signal processing unit 905 generates a driving signal based on the video data generated in this way and drives the display unit 906.

The display unit 906 drives a display device (for example, a liquid crystal display element) based on the driving signal from the video signal processing unit 905 and displays a video or the like of the program.

The voice signal processing unit 907 performs predetermined processing such as noise removal on the voice data, performs a D/A conversion process or an amplification process on the processed voice data, and supplies the voice data to the speaker 908 to perform a voice output.

The external interface unit 909 is an interface used to connect to an external apparatus or a network and performs data transmission and reception of the video data, the voice data, or the like.

The user interface unit 911 is connected to the control unit 910. The user interface unit 911 is configured to include a manipulation switch or a remote control signal reception unit and supplies a manipulation signal according to a user manipulation to the control unit 910.

The control unit 910 is configured using a CPU (Central Processing Unit), a memory, or the like. The memory stores a program to be executed by the CPU, various kinds of data necessary for the CPU to perform a process, EPG data, data acquired via a network, and the like. The program stored in the memory is read and executed by the CPU at a predetermined timing such as the time of activation of the television apparatus 900. The CPU performs the program to control each unit such that the television apparatus 900 operates according to a user manipulation.

In the television apparatus 900, a bus 912 is installed to connect the control unit 910 to the tuner 902, the demultiplexer 903, the video signal processing unit 905, the voice signal processing unit 907, the external interface unit 909, and the like.

In the television apparatus configured in this way, the function of the decoding device (decoding method) of the present application is installed in the decoder 904. Therefore, it is possible to decode the encoded stream for which the encoding amount of the encoded stream is reduced when the information regarding the depth image is included in the encoded stream.

<Example of Configuration of Portable Telephone>

Figure 26:
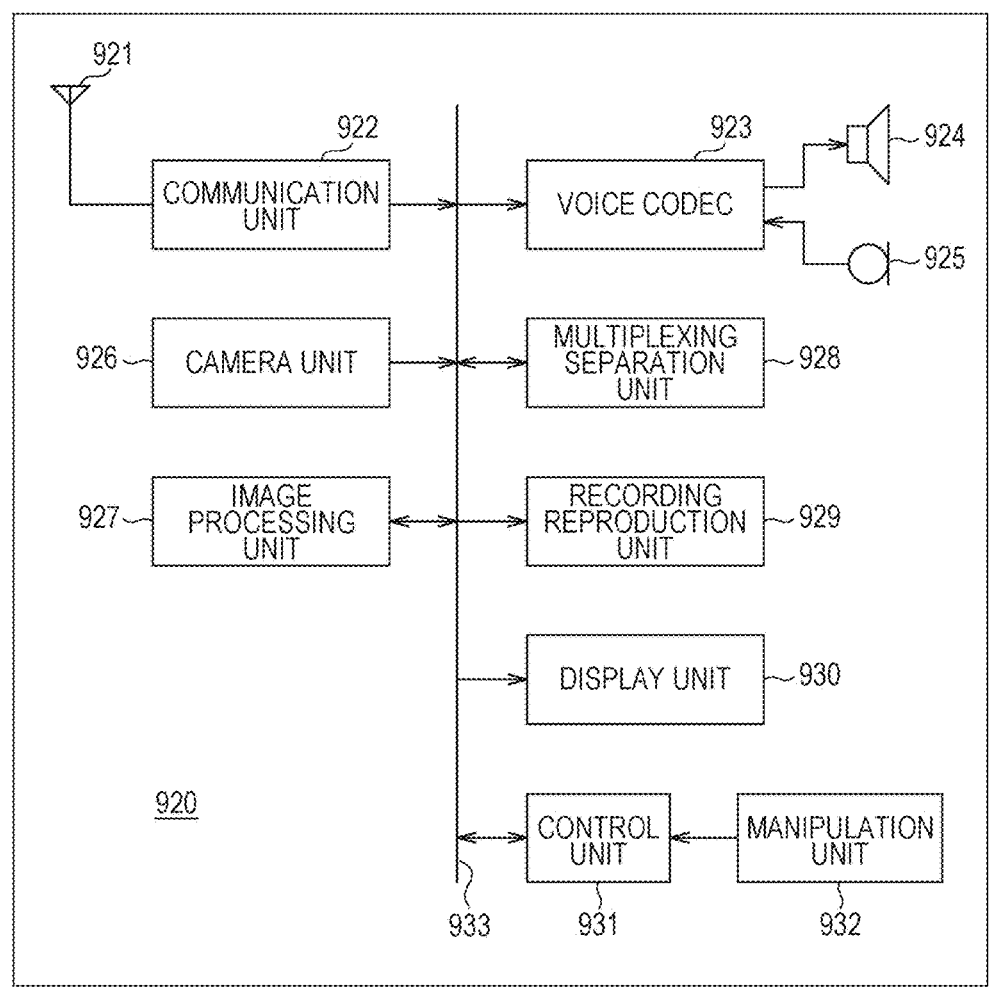
FIG. 26 is a diagram illustrating an example of an overall configuration of a portable telephone to which the present technology is applied.

FIG. 26 exemplifies an overall configuration of a portable telephone to which the present technology is applied. A portable telephone 920 includes a communication unit 922, a voice codec 923, a camera unit 926, an image processing unit 927, a multiplexing separation unit 928, a recording reproduction unit 929, a display unit 930, and a control unit 931. These units are connected to each other via a bus 933.

An antenna 921 is connected to the communication unit 922, and a speaker 924 and a microphone 925 are connected to the voice codec 923. A manipulation unit 932 is also connected to the control unit 931.

The portable telephone 920 performs various operations such as transmission and reception of a voice signal, transmission and reception of an electronic mail or image data, image photographing, and data recording in various modes such as a voice telephone mode or a data communication mode.

In the voice telephone mode, a voice signal generated by the microphone 925 is subjected to conversion to voice data or data compression by the voice codec 923 to be supplied to the communication unit 922. The communication unit 922 performs a voice data modulation process, a frequency conversion process, or the like to generate a transmission signal. The communication unit 922 supplies the transmission signal to the antenna 921 to transmit a base station (not illustrated). The communication unit 922 performs amplification, a frequency conversion process, a demodulation process, or the like on a received signal received by the antenna 921 and supplies obtained voice data to the voice codec 923. The voice codec 923 performs data decompression on the voice data or converts the voice data into an analog voice signal and outputs the analog voice signal to the speaker 924.

When mail transmission is performed in the data communication mode, the control unit 931 receives letter data input through a manipulation of the manipulation unit 932 and displays input letters on the display unit 930. The control unit 931 generates mail data based on a user instruction or the like in the manipulation unit 932 and supplies the mail data to the communication unit 922. The communication unit 922 performs a modulation process, a frequency conversion process, or the like on the mail data and transmits an obtained transmission signal from the antenna 921. The communication unit 922 performs an amplification process, a frequency conversion process, a demodulation process, or the like on a received signal received by the antenna 921 to restore mail data. The mail data is supplied to the display unit 930 to display mail content.

In the portable telephone 920, the received mail data can also be stored in a storage medium by the recording reproduction unit 929. The storage medium is any rewritable storage medium. For example, the storage medium is a removable medium such as a semiconductor memory such as a RAM or a built-in flash memory, a hard disk, a magnetic disk, a magneto-optical disc, an optical disc, a USB memory, or a memory card.

When image data is transmitted in the data communication mode, image data generated by the camera unit 926 is supplied to the image processing unit 927. The image processing unit 927 performs an encoding process on the image data to generate encoded data.

The multiplexing separation unit 928 multiplexes the encoded data generated by the image processing unit 927 and the voice data supplied from the voice codec 923 according to a predetermined scheme and supplies the multiplexed encoded data and voice data to the communication unit 922. The communication unit 922 performs a modulation process, a frequency conversion process, or the like on the multiplexed data and transmits an obtained transmission signal from the antenna 921. The communication unit 922 performs an amplification process, a frequency conversion process, a demodulation process, or the like on a received signal received by the antenna 921 to restore multiplexed data. The multiplexed data is supplied to the multiplexing separation unit 928. The multiplexing separation unit 928 separates the multiplexed data and supplies the encoded data and the voice data to the image processing unit 927 and the voice codec 923, respectively. The image processing unit 927 performs a decoding process on the encoded data to generate image data. The image data is supplied to the display unit 930 to display a received image. The voice codec 923 converts the voice data into an analog voice signal, supplies the analog voice signal to the speaker 924, and outputs a received voice.

In the portable telephone apparatus configured in this way, the functions of the encoding device (encoding method) and the decoding device (decoding method) of the present application are installed in the image processing unit 927. Therefore, it is possible to reduce the encoding amount of the encoded stream when the information regarding the depth image is included in the encoded stream. Further, it is possible to decode the encoded stream for which the encoding amount of the encoded stream is reduced when the information regarding the depth image is included in the encoded stream.

<Example of Configuration of Recording Reproduction Apparatus>

Figure 27:
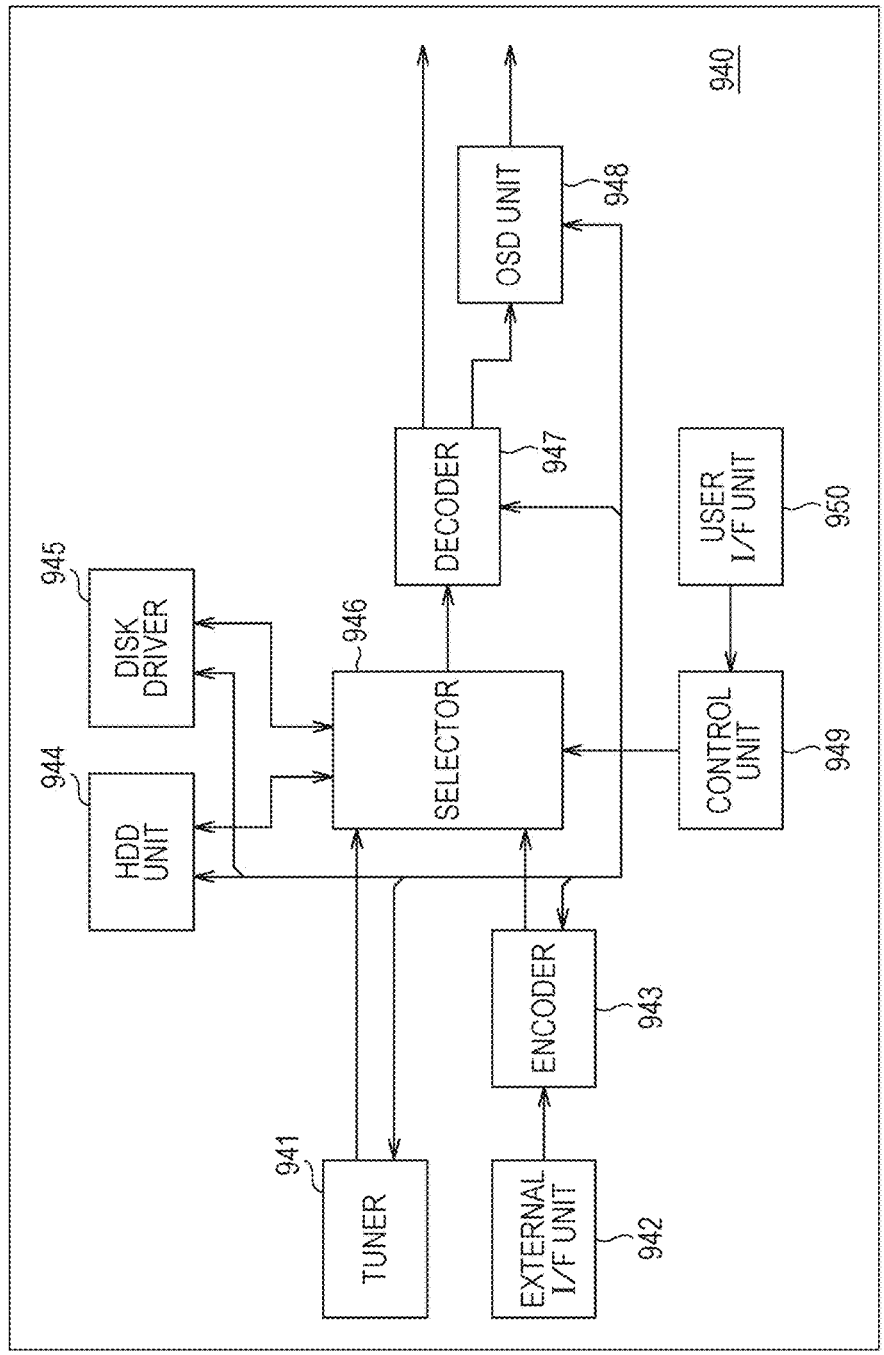
FIG. 27 is a diagram illustrating an example of an overall configuration of a recording reproduction apparatus to which the present technology is applied.

FIG. 27 exemplifies an overall configuration of a recording reproduction apparatus to which the present technology is applied. For example, a recording reproduction apparatus 940 records audio data and video data of a received broadcasting program in a recording medium and supplies the recorded data to a user at a timing according to an user instruction. For example, the recording reproduction apparatus 940 can acquire the audio data and the video data from another apparatus and record the audio data and the video data in a recording medium. The recording reproduction apparatus 940 decodes and outputs the audio data and the video data recorded in the recording medium, so that an image display or an audio output can be performed on a monitor apparatus or the like.

The recording reproduction apparatus 940 includes a tuner 941, an external interface unit 942, an encoder 943, an HDD (Hard Disk Drive) unit 944, a disk driver 945, a selector 946, a decoder 947, an OSD (On-Screen Display) unit 948, a control unit 949, and a user interface unit 950.

The tuner 941 tunes a desired channel from a broadcasting signal received by an antenna (not illustrated). The tuner 941 outputs an encoded bit stream obtained by decoding the received signal of the desired channel to the selector 946.

The external interface unit 942 is configured to include at least one of an IEEE 1394 interface, a network interface unit, a USB interface, and a flash memory interface. The external interface unit 942 is an interface used to connect an external apparatus, a network, a memory card, or the like and receives data such as video data or voice data to be recorded.

The encoder 943 encodes the video data or the voice data according to a predetermined scheme when the video data or the voice data supplied from the external interface unit 942 is not encoded, and outputs an encoded bit stream to the selector 946.

The HDD unit 944 records content data such as a video, a voice, or the like, various programs, and other data in a built-in hard disk and reads the content data, the programs, and the other data from the hard disk at the time of reproduction or the like.

The disk driver 945 records and reproduces a signal on a mounted optical disc. The optical disc is, for example, a DVD disk (DVD-Video, DVD-RAM, DVD-R, DVD-RW, DVD+R, DVD+RW, or the like) or a Blu-ray disc.

The selector 946 selects one encoded bit stream from the tuner 941 or the encoder 943 at the time of recording of a video or a voice and supplies the encoded bit stream to one of the HDD unit 944 and the disk driver 945. The selector 946 supplies the encoded bit stream output from the HDD unit 944 or the disk driver 945 to the decoder 947 at the time of reproduction of a video or a voice.

The decoder 947 performs a decoding process on the encoded bit stream. The decoder 947 supplies the video data generated by performing the decoding process to the OSD unit 948. The decoder 947 outputs the generated voice data by performing the decoding process.

The OSD unit 948 generates video data for displaying a menu screen or the like for selection or the like of items, overlaps the video data with the video data output from the decoder 947, and outputs the overlapped video data.

The user interface unit 950 is connected to the control unit 949. The user interface unit 950 is configured to include a manipulation switch or a remote control signal reception unit and supplies a manipulation signal according to a user manipulation to the control unit 949.

The control unit 949 is configured using a CPU, a memory, or the like. The memory stores a program to be executed by the CPU and various kinds of data necessary for the CPU to perform a process. The program stored in the memory is read and executed by the CPU at a predetermined timing such as the time of activation of the recording reproduction apparatus 940. The CPU performs the program to control each unit such that the recording reproduction apparatus 940 operates according to a user manipulation.

In the recording reproduction apparatus configured in this way, the function of the decoding device (decoding method) of the present application is installed in the decoder 947. Therefore, it is possible to decode the encoded stream for which the encoding amount of the encoded stream is reduced when the information regarding the depth image is included in the encoded stream.

<Example of Configuration of Imaging Apparatus>

Figure 28:
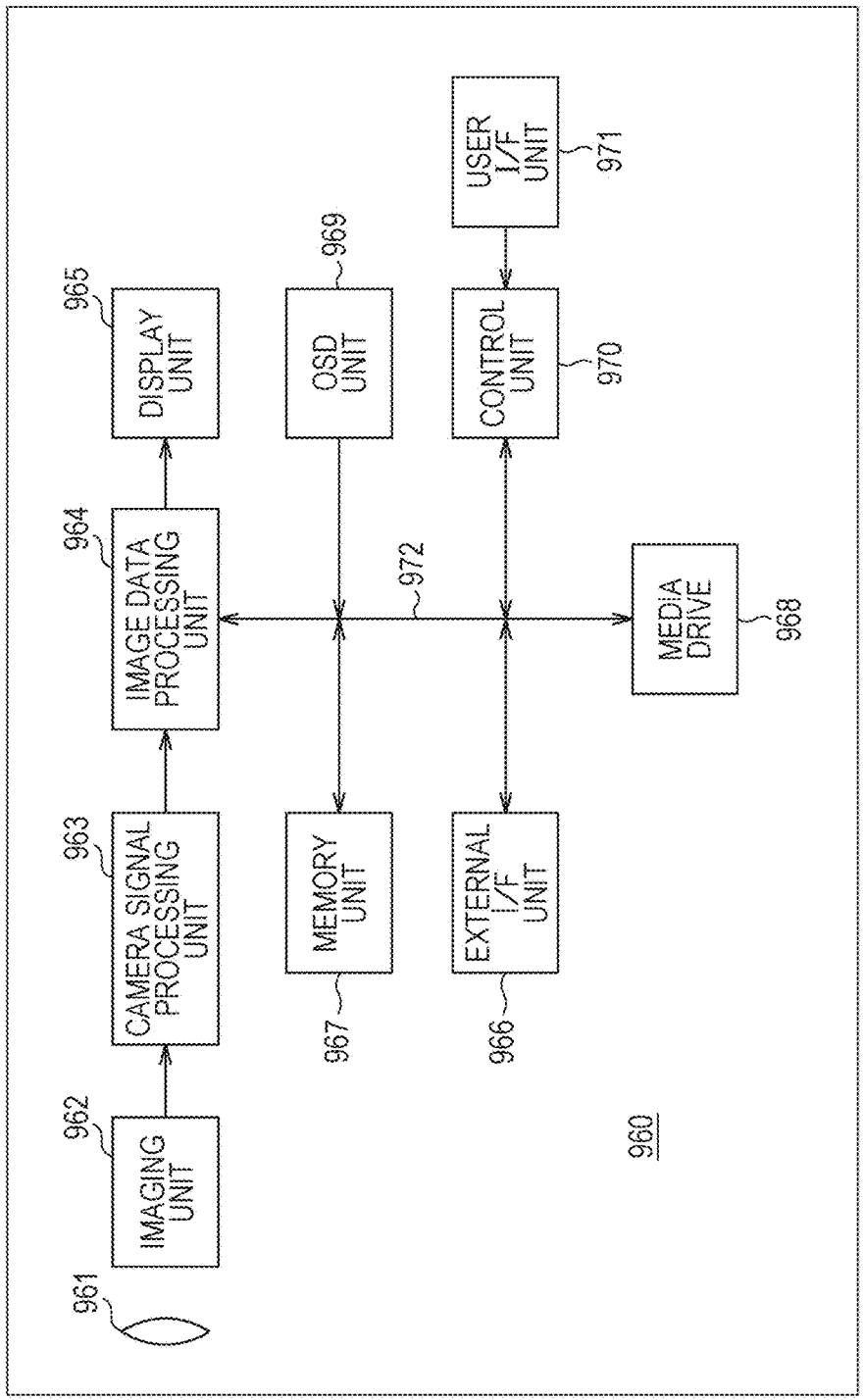
FIG. 28 is a diagram illustrating an example of an overall configuration of an imaging apparatus to which the present technology is applied.

FIG. 28 exemplifies an overall configuration of an imaging apparatus to which the present technology is applied. An imaging apparatus 960 images a subject and displays an image of the subject or records the image of the subject as image data on a recording medium.

The imaging apparatus 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. The image data processing unit 964, the external interface unit 966, the memory unit 967, the media drive 968, the OSD unit 969, the control unit 970, and the like are connected to each other via a bus 972.

The optical block 961 is configured using a focus lens, an aperture mechanism, and the like. The optical block 961 forms an optical image of a subject on an imaging surface of the imaging unit 962. The imaging unit 962 is configured using a CCD or CMOS image sensor, generates an electric signal according to the optical image through photoelectric conversion, and supplies the electric signal to the camera signal processing unit 963.

The camera signal processing unit 963 performs various kinds of camera signal processing such as knee correction, gamma correction, color correction on the electric signal supplied from the imaging unit 962. The camera signal processing unit 963 supplies the image data after the camera signal processing to the image data processing unit 964.

The image data processing unit 964 performs an encoding process on the image data supplied from the camera signal processing unit 963. The image data processing unit 964 supplies encoded data generated by performing the encoding process to the external interface unit 966 or the media drive 968. The image data processing unit 964 performs a decoding process on the encoded data supplied from the external interface unit 966 or the media drive 968. The image data processing unit 964 supplies the image data generated by performing the decoding process to the display unit 965. The image data processing unit 964 supplies the image data supplied from the camera signal processing unit 963 to the display unit 965, allows display data acquired from the OSD unit 969 to overlap with the image data, and supplies the overlapping data to the display unit 965.

The OSD unit 969 generates display data such as a menu screen, an icon, or the like formed by signs, letters, or figures and outputs the display data to the image data processing unit 964.

The external interface unit 966 is configured to include, for example, a USB input/output terminal and is connected to a printer when an image is printed. A drive is connected to the external interface unit 966, as necessary, a removable medium such as a magnetic disk or an optical disc is properly mounted, and a computer program read from the removable medium is installed, as necessary. The external interface unit 966 includes a network interface connected to a predetermined network such as a LAN or the Internet. For example, the control unit 970 can read encoded data from the memory unit 967 according to an instruction from the user interface unit 971 and supply the encoded data from the external interface unit 966 to another apparatus connected via the network. The control unit 970 can acquire encoded data or image data supplied from another apparatus via a network through the external interface unit 966 and supply the encoded data or the image data to the image data processing unit 964.

As a recording medium driven by the media drive 968, for example, any readable/writable removable medium such as a magnetic disk, a magneto-optical disc, an optical disc, or a semiconductor memory is used. Any kind of removable medium can be used as the recording medium. A tape device may be used, a disk may be used, or a memory card may be used. Of course, a contactless IC card or the like may be used.

The media drive 968 may be integrated with a recording medium and may thus be configured by, for example, a non-portable storage medium such as a built-in hard disk drive or an SSD (Solid State Drive).

The control unit 970 is configured using a CPU, a memory, or the like. The memory stores a program to be executed by the CPU and various kinds of data necessary for the CPU to perform a process. The program stored in the memory is read and executed by the CPU at a predetermined timing such as the time of activation of the imaging apparatus 960. The CPU performs the program to control each unit such that the imaging apparatus 960 operates according to a user manipulation.

In the imaging apparatus configured in this way, the functions of the encoding device (encoding method) and the decoding device (decoding method) of the present application are installed in the image data processing unit 964. Therefore, it is possible to reduce the encoding amount of the encoded stream when the information regarding the depth image is included in the encoded stream. Further, it is possible to decode the encoded stream for which the encoding amount of the encoded stream is reduced when the information regarding the depth image is included in the encoded stream.

Embodiments of the present technology are not limited to the above-described embodiments, but may be modified in various ways within the scope without departing from the gist of the present technology.

The present technology can be configured as follows.

(1)

An encoding device includes: a setting unit that sets depth image information which is information regarding a depth image as a parameter set different from a sequence parameter set and a picture parameter set; an encoding unit that encodes the depth image to generate encoded data; and a transmission unit that transmits an encoded stream including the parameter set which is set by the setting unit and the encoded data generated by the encoding unit.

(2)

In the encoding device described in the foregoing (1), the setting unit may set an ID uniquely identifying the parameter set in the parameter set. The transmission unit may transmit the encoded stream including the ID corresponding to the depth image.

(3)

In the encoding device described in the foregoing (2), the setting unit may set the ID corresponding to the depth image of a slice unit in a slice header of the depth image. The transmission unit may transmit the encoded stream including the slice header set by the setting unit.

(4)

In the encoding device described in any one of the foregoing (1) to (3), the setting unit may perform differential encoding on the depth image information and set a differential encoding result of the depth image information as the parameter set.

(5)

In the encoding device described in any one of the foregoing (1) to (4), the encoding unit may encode the depth image based on the depth image information.

(6)

In the encoding device described in any one of the foregoing (1) to (5), the depth image information may include a maximum value and a minimum value of a pixel value of the depth image and a distance between cameras capturing the depth image.

(7)

In the encoding device described in any one of the foregoing (1) to (6), an NAL (Network Abstraction Layer) unit type different from the sequence parameter set and the picture parameter set may be set in the parameter set.

(8)

In the encoding device described in any one of the foregoing (1) to (7), the setting unit may set identification information identifying presence of the depth image information. The transmission unit may transmit the encoded stream including the identification information set by the setting unit.

(9)

An encoding method includes: a setting step of setting depth image information which is information regarding a depth image as a parameter set different from a sequence parameter set and a picture parameter set; and an encoding step of encoding the depth image to generate encoded data; and a transmission step of transmitting an encoded stream including the parameter set which is set in a process of the setting step and the encoded data generated in a process of the encoding step, which are performed by an encoding device.

(10)

A decoding device includes: an acquisition unit that acquires a parameter set and encoded data from an encoded stream including the parameter set in which depth image information, which is information regarding a depth image, is set and which is different from a sequence parameter set and a picture parameter set and the encoded data of the depth image; a parsing processing unit that parses the depth image information from the parameter set acquired by the acquisition unit; and a decoding unit that decodes the encoded data acquired by the acquisition unit.

(11)

In the decoding device described in the foregoing (10), an ID uniquely identifying the parameter set may be set in the parameter set. The encoded stream may include the ID corresponding to the depth image.

(12)

In the decoding device described in the foregoing (11), the encoded stream includes a slice header in which the ID corresponding to the depth image of a slice unit is set.

(13)

The decoding device described in any one of the foregoing (10) to (12) may further include a generation unit that generates the depth image information by decoding a differential encoding result of the depth image information. The encoded stream may include the parameter set in which the differential encoding result of the depth image information is set. The generation unit may generate the depth image information by decoding the differential encoding result of the depth image information set as the parameter set.

(14)

In the decoding device described in any one of the foregoing (10) to (13), the decoding unit may decode the encoded data based on the depth image information parsed by the parsing processing unit.

(15)

In the decoding device described in any one of the foregoing (10) to (14), the depth image information may include a maximum value and a minimum value of a pixel value of the depth image and a distance between cameras capturing the depth image.

(16)

In the decoding device described in any one of the foregoing (10) to (15), an NAL (Network Abstraction Layer) unit type different from the sequence parameter set and the picture parameter set is set in the parameter set.

(17)

In the decoding device described in any one of the foregoing (10) to (16), the encoded stream may include identification information identifying presence of the depth image information.

(18)

A decoding method includes: an acquisition step of acquiring a parameter set and encoded data from an encoded stream including the parameter set in which depth image information, which is information regarding a depth image, is set and which is different from a sequence parameter set and a picture parameter set and the encoded data of the depth image; a parsing processing step of parsing the depth image information from the parameter set acquired in a process of the acquisition step; and a decoding step of decoding the encoded data acquired in the process of the acquisition step, which are performed by a decoding device.

REFERENCE SIGNS LIST

50 ENCODING DEVICE, 51 MULTI-VIEW COLOR IMAGE CAPTURING UNIT, 52 MULTI-VIEW COLOR IMAGE CORRECTION UNIT, 53 MULTI-VIEW DEPTH IMAGE GENERATION UNIT, 54 DEPTH IMAGE INFORMATION GENERATION UNIT, 55 MULTI-VIEW IMAGE ENCODING UNIT, 61 SPS ENCODING UNIT, 62 PPS ENCODING UNIT, 63 DPS ENCODING UNIT, 64 SLICE HEADER ENCODING UNIT, 65 SLICE ENCODING UNIT, 80 DECODING DEVICE, 81 MULTI-VIEW IMAGE DECODING UNIT, 82 VIEWPOINT SYNTHESIS UNIT, 101 SPS DECODING UNIT, 102 PPS DECODING UNIT, 103 DPS DECODING UNIT, 104 SLICE HEADER DECODING UNIT, 105 SLICE DECODING UNIT

The invention claimed is:

1. A decoding device comprising:
    acquiring circuitry configured to acquire, from an encoded stream generated by a depth image, depth image information including a maximum value and a minimum value of a pixel value of the depth image and a distance between cameras capturing the depth image as a depth parameter set (DPS) different from a sequence parameter set (SPS) and a picture parameter set (PPS), a DPS identifier (ID) that uniquely identifies the DPS in the DPS, and the DPS ID in a slice header of the depth image; and
    decoding circuitry configured to decode the encoded stream using the DPS.

2. The decoding device according to claim 1,
    wherein the decoding circuitry is configured to decode the encoded stream including the slice header.

3. The decoding device according to claim 1, wherein the setting circuitry is configured to perform differential decoding on the depth image information and acquire a differential encoding result of the depth image information as the (DPS).

4. The decoding device according to claim 1, wherein the decoding circuitry is configured to decode the encoded stream using the depth image information.

5. The decoding device according to claim 1, wherein the acquiring circuitry is configured to acquire the DPS as a NAL (Network Abstraction Layer) unit type different from the SPS and the PPS.

6. The decoding device according to claim 1,
    wherein the acquiring circuitry is configured to acquire identification information identifying presence of the depth image information, and
    wherein the decoding circuitry is configured to decode the encoded stream including the identification information.

7. A decoding method of a decoding device comprising:
acquiring, from an encoded stream generated by a depth image, depth image information including a maximum value and a minimum value of a pixel value of the depth image and a distance between cameras capturing the depth image as a depth parameter set (DPS) different from a sequence parameter set (SPS) and a picture parameter set (PPS), a DPS identifier (ID) that uniquely identifies the DPS in the DPS, and the DPS ID in a slice header of the depth image; and
decoding the encoded stream using the DPS.

* * * * *